(12) United States Patent
Lu et al.

(10) Patent No.: US 8,830,426 B2
(45) Date of Patent: Sep. 9, 2014

(54) COLOR SHIFT REDUCTION IN TRANSFLECTIVE LIQUID CRYSTAL DISPLAYS

(75) Inventors: Ruibo Lu, San Bruno, CA (US); Mary Lou Jepsen, Sausalito, CA (US)

(73) Assignee: Pixel Qi Corporation, San Bruno, CA (US)

( * ) Notice: Subject to any disclaimer, the term of this patent is extended or adjusted under 35 U.S.C. 154(b) by 579 days.

(21) Appl. No.: 12/948,174

(22) Filed: Nov. 17, 2010

(65) Prior Publication Data

US 2012/0120341 A1    May 17, 2012

(51) Int. Cl.
*G02F 1/1335* (2006.01)

(52) U.S. Cl.
USPC .......................................... 349/117; 349/114

(58) Field of Classification Search
CPC ................. G02F 1/133632; G02F 2203/09
USPC .......................................... 349/114, 117–118
See application file for complete search history.

(56) References Cited

U.S. PATENT DOCUMENTS

| | | | |
|---|---|---|---|
| 4,850,681 A | 7/1989 | Yamanobe et al. | |
| 6,014,197 A | 1/2000 | Hikmet | |
| 6,057,901 A * | 5/2000 | Xu | 349/121 |
| 6,341,002 B1 | 1/2002 | Shimizu et al. | |
| 6,449,092 B1 | 9/2002 | Weber et al. | |
| 6,917,404 B2 | 7/2005 | Baek | |
| 7,008,409 B2 | 3/2006 | Spiezio et al. | |
| 7,209,212 B2 | 4/2007 | Chuang et al. | |
| 7,358,943 B2 | 4/2008 | Asao | |
| 7,388,635 B2 | 6/2008 | Aoki | |
| 7,940,340 B2 | 5/2011 | Ludwig et al. | |
| 2001/0046142 A1 | 11/2001 | Van Santen et al. | |
| 2002/0054269 A1 | 5/2002 | Maeda et al. | |
| 2002/0145688 A1 | 10/2002 | Sekiguchi | |
| 2004/0001171 A1 | 1/2004 | Chung | |
| 2004/0004687 A1 | 1/2004 | Baek | |
| 2004/0027516 A1 | 2/2004 | Liu | |
| 2004/0160559 A1 | 8/2004 | Kim et al. | |
| 2004/0201560 A1 | 10/2004 | Shen et al. | |
| 2004/0227878 A1 | 11/2004 | Ashida et al. | |
| 2004/0252092 A1 | 12/2004 | Roosendaal | |

(Continued)

FOREIGN PATENT DOCUMENTS

| | | |
|---|---|---|
| CN | 1873498 A | 12/2006 |
| CN | 1942812 A | 4/2007 |

(Continued)

OTHER PUBLICATIONS

Korean Patent Office, Office Action in application No. 10-2011-7023800, dated Nov. 29, 2012, 6 pages.

(Continued)

*Primary Examiner* — Nathanael R Briggs
(74) *Attorney, Agent, or Firm* — Hickman Palermo Truong Becker Bingham Wong LLP

(57) ABSTRACT

Techniques are provided to reduce color shifts in an LCD. A sub-pixel in the LCD may comprise a reflective part and a transmissive part. The reflective and transmissive parts may be covered by one or more retardation films. To reduce color shifts in general and especially in oblique viewing angles, at least one retardation film in the sub-pixel may comprise a slow axis with an elevation angle from a surface of a substrate layer of the LCD.

18 Claims, 17 Drawing Sheets

(56) References Cited

U.S. PATENT DOCUMENTS

| | | | |
|---|---|---|---|
| 2005/0057704 | A1 | 3/2005 | Ootake et al. |
| 2005/0083462 | A1 | 4/2005 | Lin |
| 2005/0140862 | A1 | 6/2005 | Jang et al. |
| 2006/0044240 | A1 | 3/2006 | Takizawa et al. |
| 2006/0050209 | A1 | 3/2006 | Higa |
| 2006/0203157 | A1 | 9/2006 | Ozawa et al. |
| 2006/0227283 | A1 | 10/2006 | Ooi et al. |
| 2006/0238679 | A1 | 10/2006 | Hirai |
| 2006/0274236 | A1 | 12/2006 | Chai et al. |
| 2006/0274238 | A1 | 12/2006 | Yang |
| 2007/0035684 | A1 | 2/2007 | Yang |
| 2007/0046606 | A1 | 3/2007 | Kim et al. |
| 2007/0047221 | A1 | 3/2007 | Park |
| 2007/0076152 | A1 | 4/2007 | Ito et al. |
| 2007/0126963 | A1 | 6/2007 | Yang et al. |
| 2007/0153174 | A1 | 7/2007 | Kim |
| 2007/0164953 | A1 | 7/2007 | Huang et al. |
| 2007/0242197 | A1 | 10/2007 | Watson et al. |
| 2007/0252931 | A1 | 11/2007 | Wu et al. |
| 2008/0002106 | A1 | 1/2008 | Van De Witte et al. |
| 2008/0007952 | A1 | 1/2008 | Iwane |
| 2008/0030632 | A1 | 2/2008 | Murata |
| 2008/0030656 | A1 | 2/2008 | Watson et al. |
| 2008/0030661 | A1 | 2/2008 | Tung et al. |
| 2008/0030664 | A1 | 2/2008 | Tung et al. |
| 2008/0036949 | A1 | 2/2008 | Kim et al. |
| 2008/0043185 | A1 | 2/2008 | Jeng et al. |
| 2008/0055526 | A1 | 3/2008 | Ino |
| 2008/0068543 | A1 | 3/2008 | Mitsui |
| 2008/0074592 | A1 | 3/2008 | Araki et al. |
| 2008/0100782 | A1 | 5/2008 | Choi et al. |
| 2008/0117346 | A1 | 5/2008 | Jepsen |
| 2008/0136982 | A1 | 6/2008 | Watanabe et al. |
| 2008/0151157 | A1* | 6/2008 | Okumura ............... 349/114 |
| 2008/0158486 | A1 | 7/2008 | Kim et al. |
| 2008/0205639 | A1 | 8/2008 | Braun et al. |
| 2009/0002579 | A1 | 1/2009 | Tan |
| 2009/0129116 | A1 | 5/2009 | Kim et al. |
| 2009/0244706 | A1 | 10/2009 | Levola et al. |
| 2009/0284693 | A1* | 11/2009 | Adachi et al. .................... 349/98 |
| 2010/0110351 | A1 | 5/2010 | Kim et al. |
| 2010/0134734 | A1 | 6/2010 | Kim et al. |
| 2010/0225855 | A1 | 9/2010 | Lu |
| 2010/0260030 | A1 | 10/2010 | Tao et al. |
| 2011/0285684 | A1 | 11/2011 | Lu et al. |

FOREIGN PATENT DOCUMENTS

| | | | |
|---|---|---|---|
| CN | 101140399 | A | 3/2008 |
| JP | 06-308480 | A | 11/1994 |
| JP | 07-005469 | A | 1/1995 |
| JP | 2003-248221 | A | 9/2003 |
| JP | 2003-322855 | A | 11/2003 |
| JP | 2003322855 | A | 11/2003 |
| JP | 2004-045757 | A | 2/2004 |
| JP | 2004-163893 | A | 6/2004 |
| JP | 2004-279765 | A | 10/2004 |
| JP | 2004-325790 | A | 11/2004 |
| JP | 2005-003758 | A | 1/2005 |
| JP | 2007-240726 | A | 9/2007 |
| JP | 2008077108 | A | 4/2008 |
| KR | 10-2003-0068323 | A | 8/2003 |
| KR | 20030068323 | A | 8/2003 |
| KR | 20030068323 | A | 8/2003 |
| KR | 20060125239 | A | 12/2003 |
| KR | 10-0584085 | B1 | 5/2006 |
| KR | 10-2006-0125239 | A | 12/2006 |
| KR | 10-2007-0071013 | A | 7/2007 |
| TW | 557371 | B | 10/2003 |
| TW | 567360 | | 12/2003 |
| TW | 200710484 | | 6/2006 |
| TW | 200636348 | | 10/2006 |
| TW | 200702846 | A | 6/2008 |
| TW | 200823554 | A | 6/2008 |

OTHER PUBLICATIONS

Current Claims in Korean Application No. 10-2011-7023800, dated Nov. 2012, 5 pages.
U.S. Appl. No. 12/782,574, filed May 18, 2010, Office Action, Dec. 18, 2012.
Korean Patent Office, Office Action in application No. 10-2011-7023804, dated Nov. 29, 2012, 6 pages.
Current Claims in Korean Application No. 10-2011-7023804, dated Nov. 2012, 9 pages.
Office Action in Application No. 098125404, dated Oct. 1, 2012, 7 pages.
Current Claims in Application No. 098125404, dated Oct. 2012, 5 pages.
U.S. Appl. No. 12/560,258, filed Sep. 15, 2009, Office Action, Jan. 3, 2013.
U.S. Appl. No. 12/560,217, filed Sep. 15, 2009, Office Action, Feb. 5, 2013.
International Searching Authority, "International Search Report and Written Opinion", Application No. PCT/US2009/050787, dated Feb. 17, 2010, 10 pages.
Current Claims, Application No. PCT/US2009/050787, 4 pages.
International Searching Authority, "International Search Report and Written Opinion", Application No. PCT/US2009/051946, dated Mar. 3, 2010, 15 pages.
Current Claims, Application No. PCT/US2009/051946, 11 pages.
International Searching Authority, "International Search Report and Written Opinion", Application No. PCT/US2009/051950, dated Mar. 15, 2010, 10 pages.
Current Claims, Application No. PCT/US2009/051950, 6 pages.
Wu, S.T., et al., "Mixed-Mode Twisted Nematic Liquid Crystal Cells for Reflective Displays", Applied Physics Letters, vol. 68, published Jan. 1996, 3 pages.
Wright, et al., "Resolution and Legibility: A comparison of TFTLCDs and CRTs", SID Digest, 1999, 4 pages.
Yoshitake, et al., "The Relationship between Pixel Density and Readability on Computer Displays—Effectiveness of an Anti-Aliased Front on a High Density LCD", SID Digest, 2003, 4 pages.
International Searching Authority, "International Search Report and Written Opinion", Application No. PCT/US2009/051981, dated Feb. 17, 2010, 10 pages.
Current Claims, Application No. PCT/US2009/051981, 5 pages.
International Searching Authority, "International Search Report and Written Opinion", Application No. PCT/US2009/057015, dated Apr. 30, 2010, 11 pages.
Current Claims, Application No. PCT/US2009/057015, 6 pages.
International Searching Authority, "International Search Report and Written Opinion", Application No. PCT/US2009/057010, dated May 3, 2010, 11 pages.
Current Claims, Application No. PCT/US2009/057010, 10 pages.
International Searching Authority, "The International Search Report and Written Opinion" Application No. PCT/US2010/035298, dated Feb. 23, 2011, 9 pages.
Claims as filed with PCT/2010/035298, 7 pages.
U.S. Appl. No. 12/510,424, filed Jul. 28, 2009, Restriction Requirement, Feb. 15, 2012.
U.S. Appl. No. 12/560,258, filed Sep. 15, 2009, Office Action, Apr. 13, 2012.
U.S. Appl. No. 12/510,424, filed Jul. 28, 2009, Office Action, May 15, 2012.
U.S. Appl. No. 12/560,217, filed Sep. 15, 2009, Office Action, May 7, 2012.
U.S. Appl. No. 12/560,258, filed Sep. 15, 2009, Office Action, Jul. 28, 2011.
U.S. Appl. No. 12/560,217, filed Sep. 15, 2009, Final Office Action, Sep. 28, 2012.
U.S. Appl. No. 12/560,258, filed Sep. 15, 2009, Final Office Action, Sep. 25, 2012.
U.S. Appl. No. 12/510,424, filed Jul. 28, 2009, Office Action, Aug. 15, 2012.
U.S. Appl. No. 12/560,258, filed Sep. 15, 2009, Final Office Action, Dec. 1, 2011.
Japan Patent Office, "Notice of Grounds for Rejection" in application

(56) References Cited

OTHER PUBLICATIONS

No. 2011-554029, dated May 21, 2013, 6 pages.
Current Claims in application No. 2011-554029, dated May 2013, 6 pages.
Primary Examination Report in application No. 099121075, dated May 13, 2013, 14 pages.
Current Claims in application No. 099121075, dated May 2013, 8, pages.
U.S. Appl. No. 12/560,217, filed Sep. 15, 2009, Office Action, May 13, 2013.
Korean Patent Office, Office Action in application No. 10-2011-7004635, dated Mar. 27, 2013, 2pages.
Current Claims in Korean Application No. 10-2011-7004635, dated Mar. 2013, 4 pages.
Office Action in application No. 098131119 dated May 1, 2013, 6 pages.
Current Claims in application No. 098131119, dated May 2013, 6 pages.
U.S. Appl. No. 12/782,574, filed May 18, 2010, Final Office Action, Jul. 11, 2013.
U.S. Appl. No. 12/560,258, filed Sep. 15, 2009, Office Action, Jun. 18, 2013.
U.S. Appl. No. 12/510,424, filed Jul. 28, 2009, Notice of Allowance, Nov. 8, 2012.
The State Intellectual Property Office of the People's Republic of China, "First Office Action" in application No. 200980159175.4, dated Dec. 18, 2013, 9 pages.
Current Claims in application No. 200980159175.4, dated Dec. 2013, 9 pages.
The State Intellectual Property Office of the People's Republic of China, "Office Action" in application No. 200980159174.X, dated Dec. 4, 2013, 10 pages.
Current Claims in application No. 200980159174.X, dated Dec. 2013, 10 pages.

\* cited by examiner

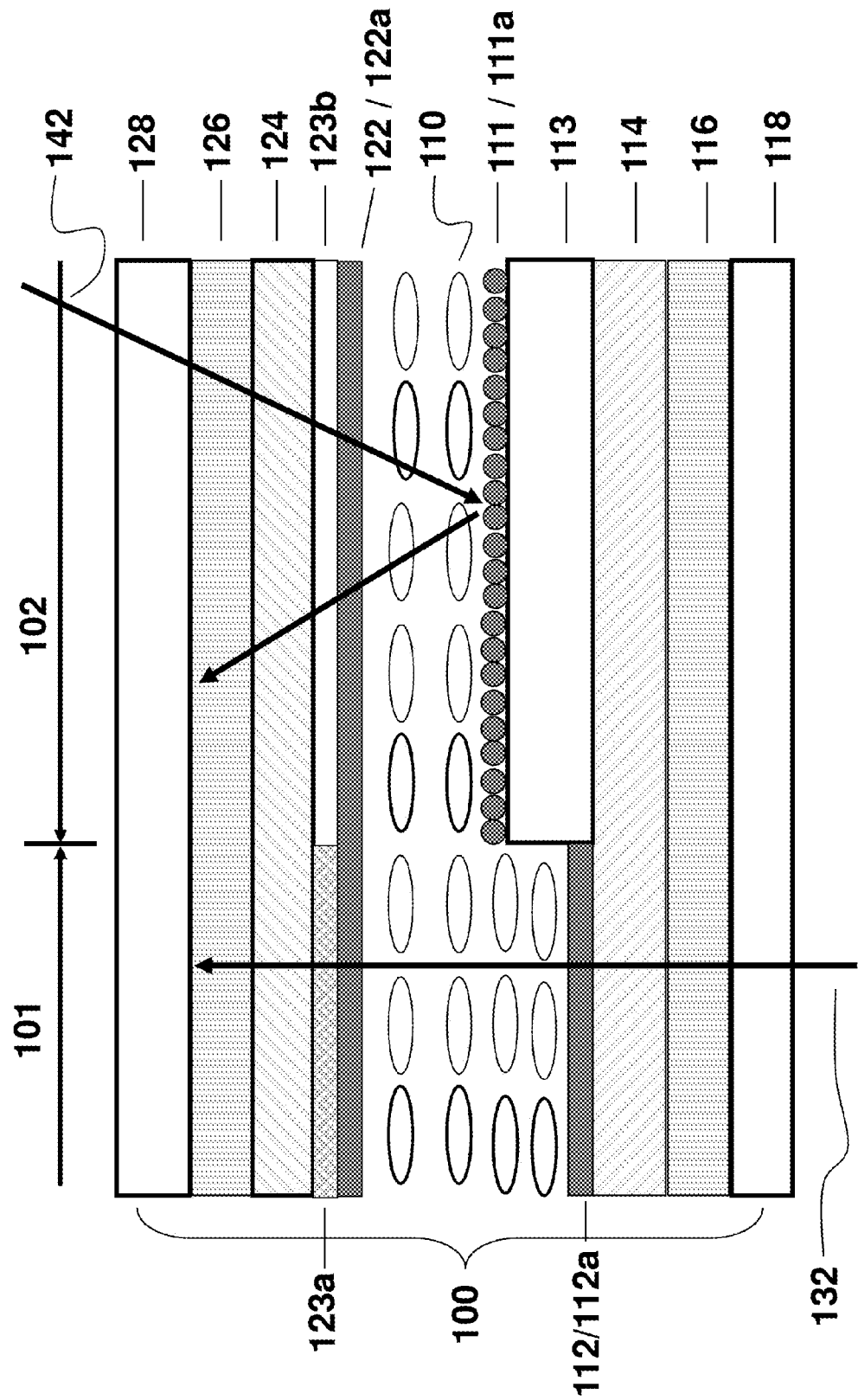

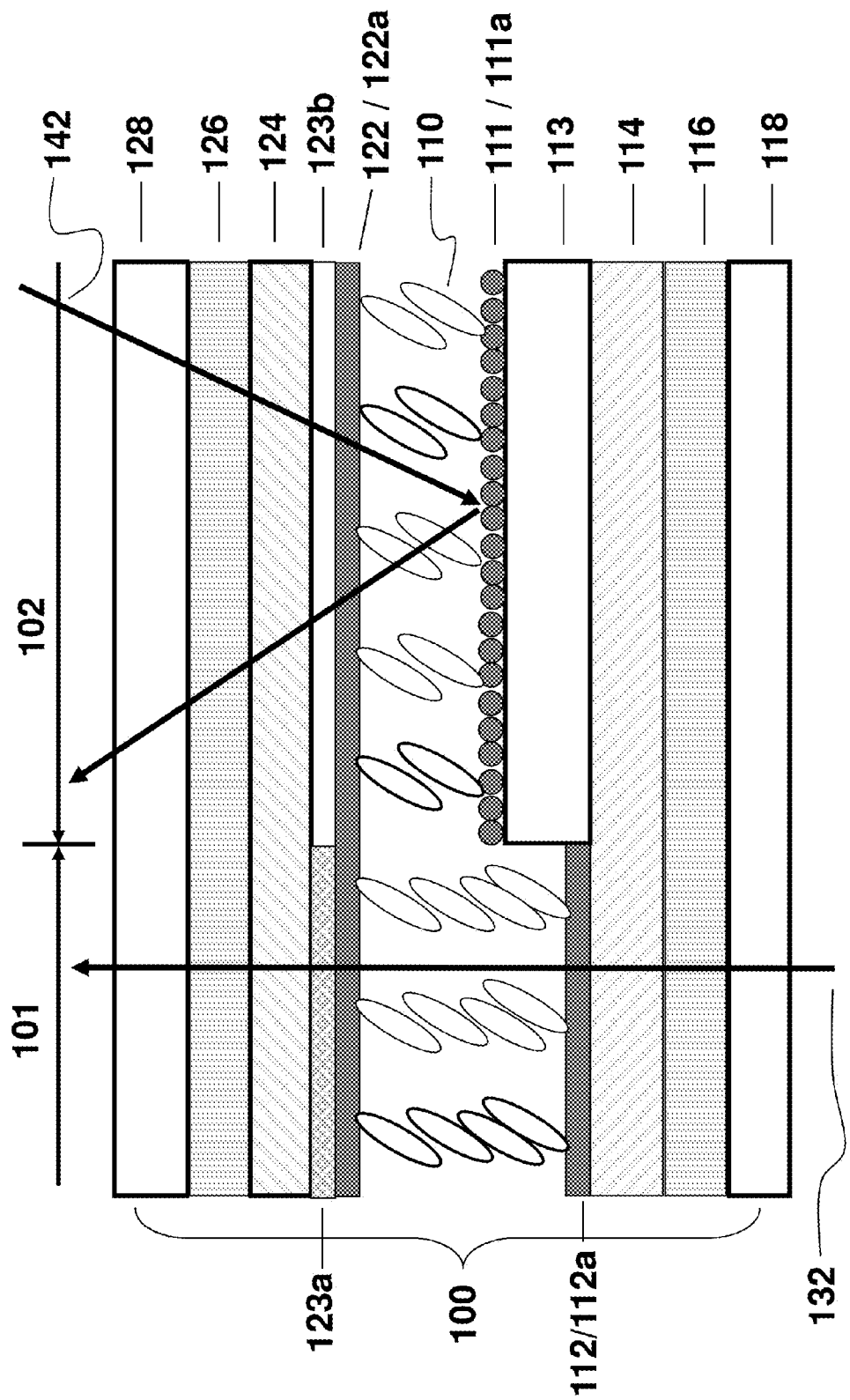

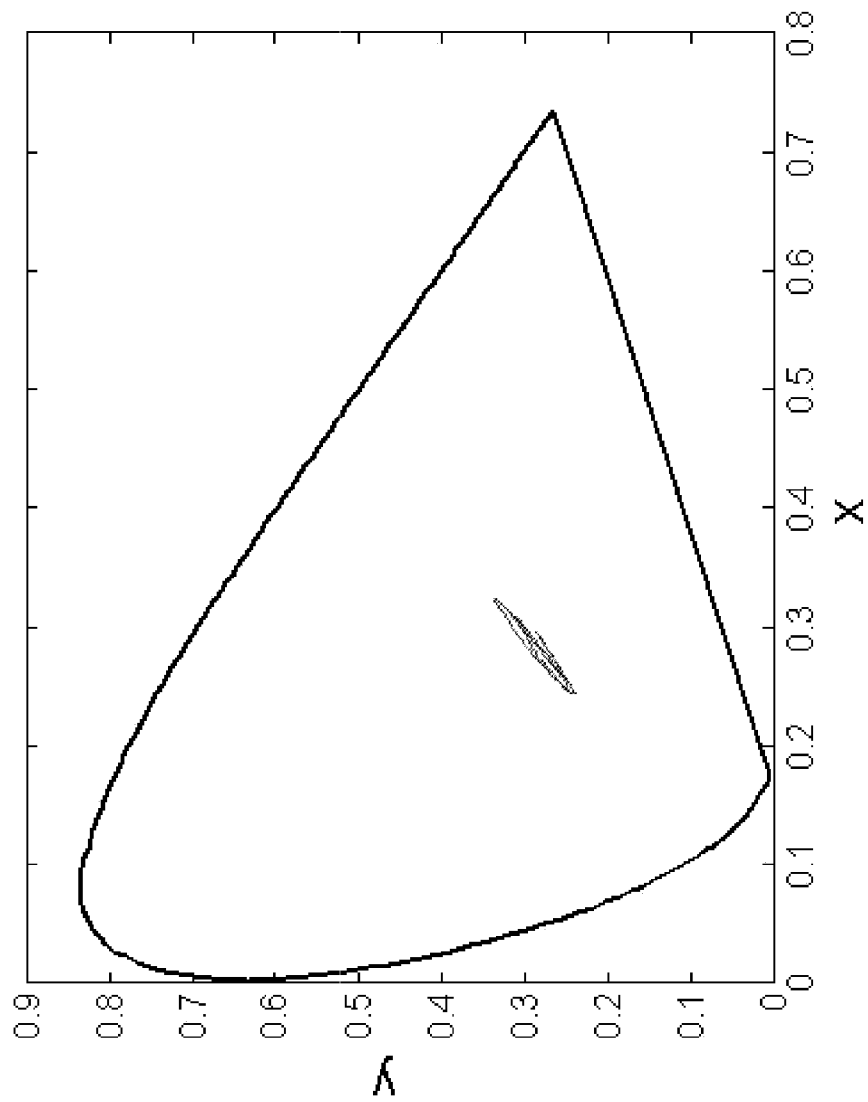

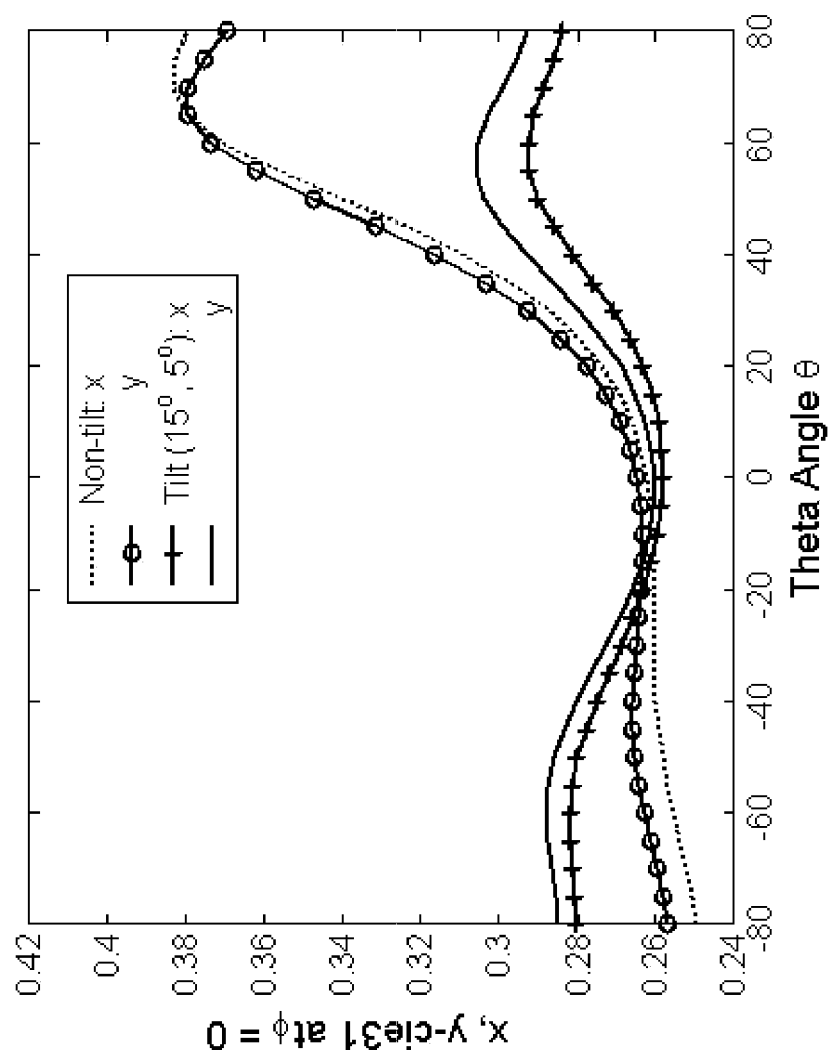

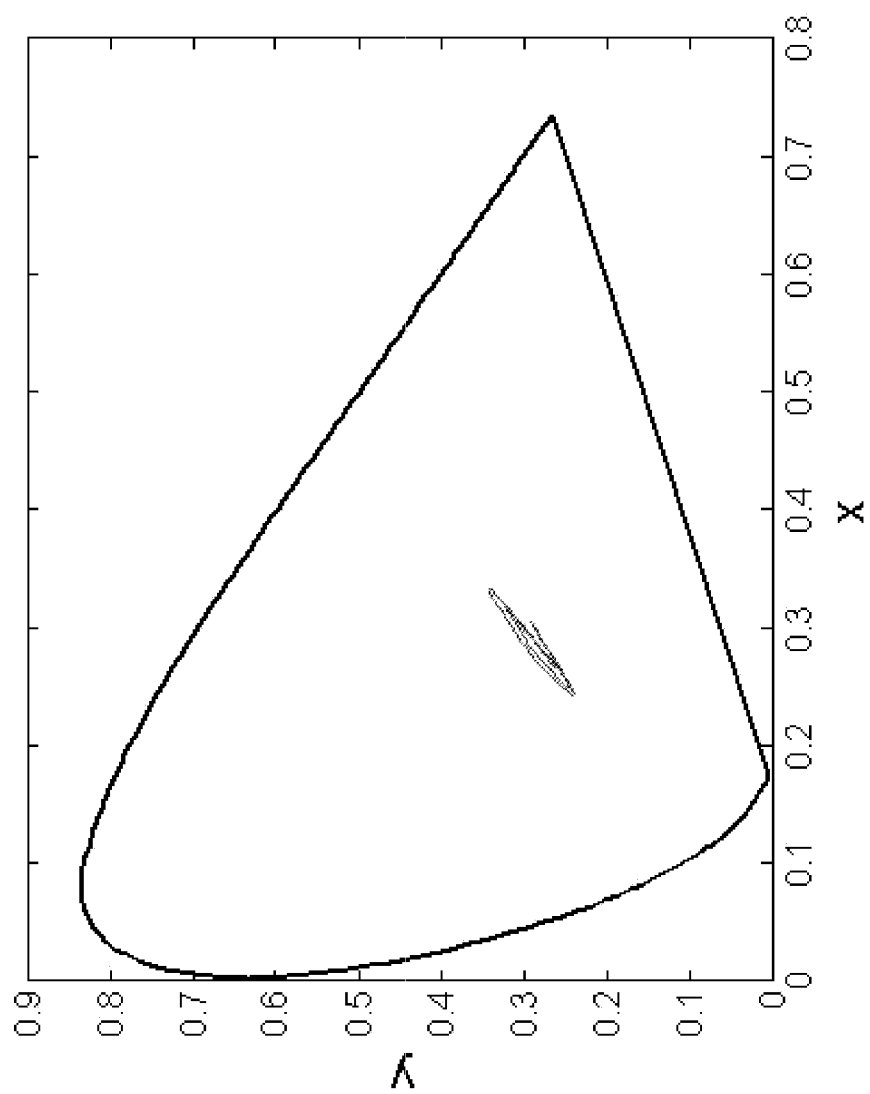

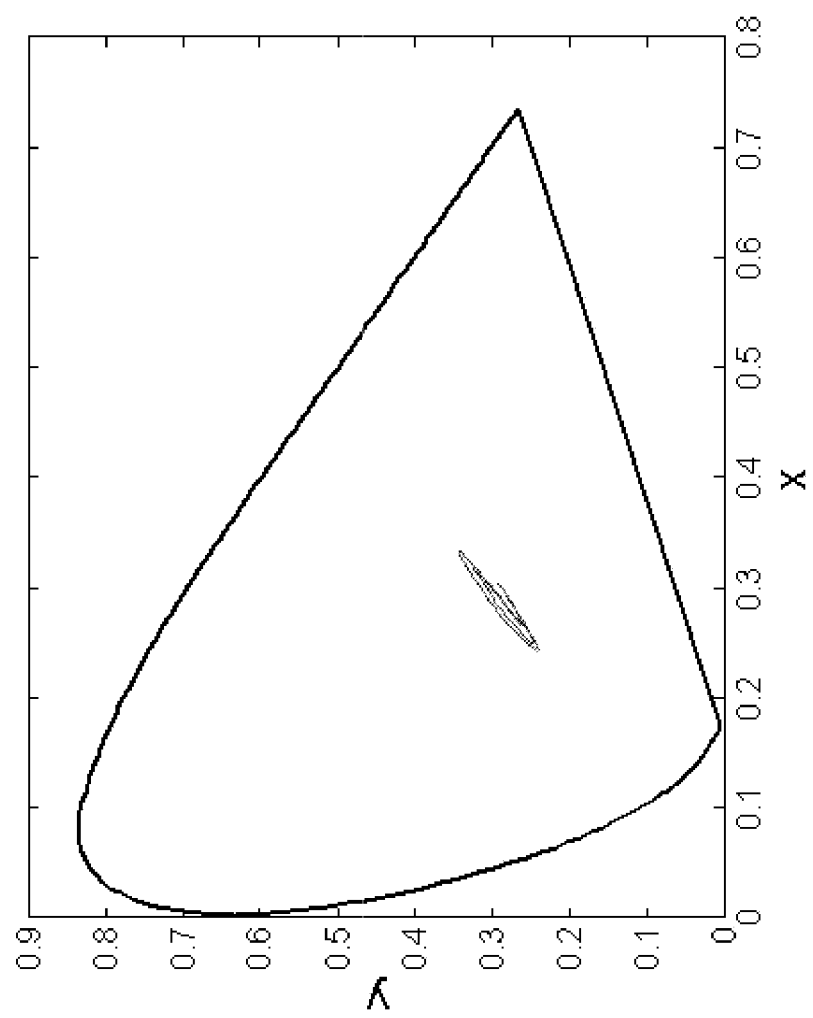

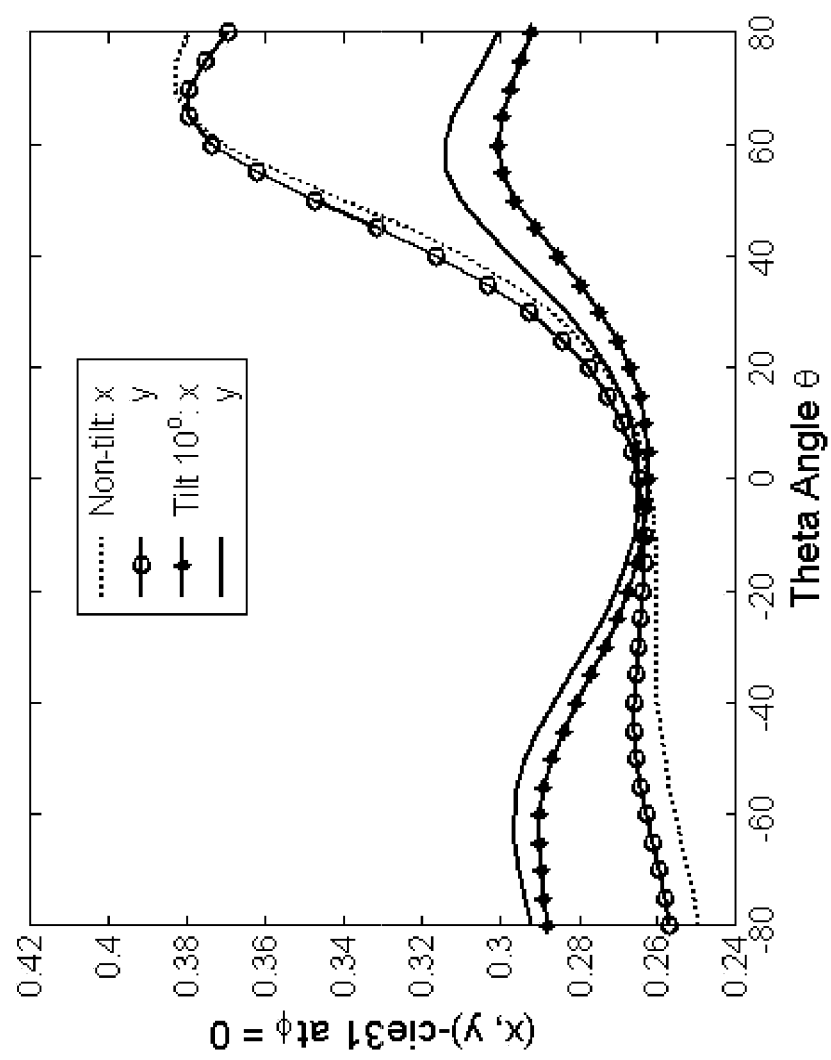

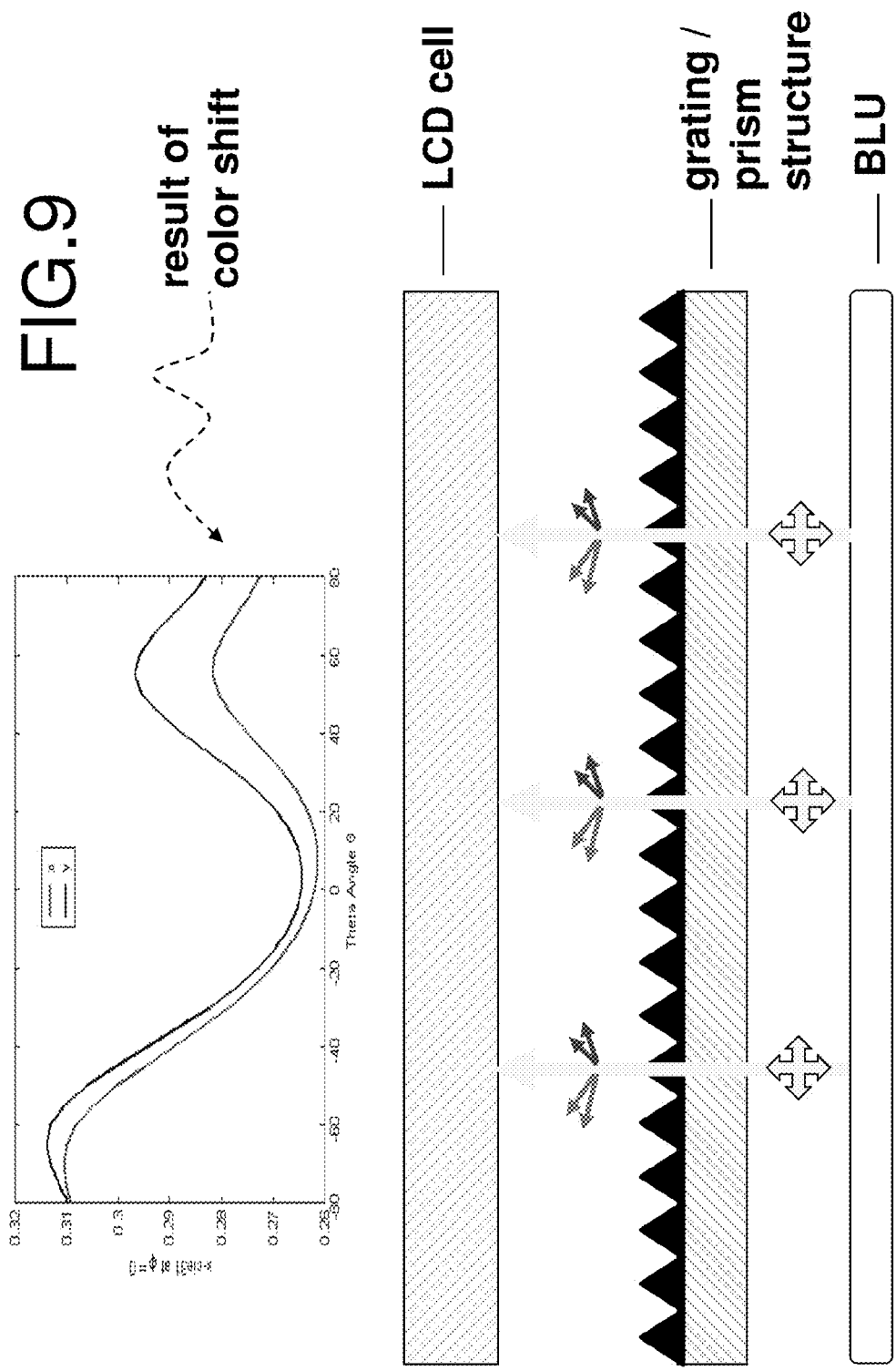

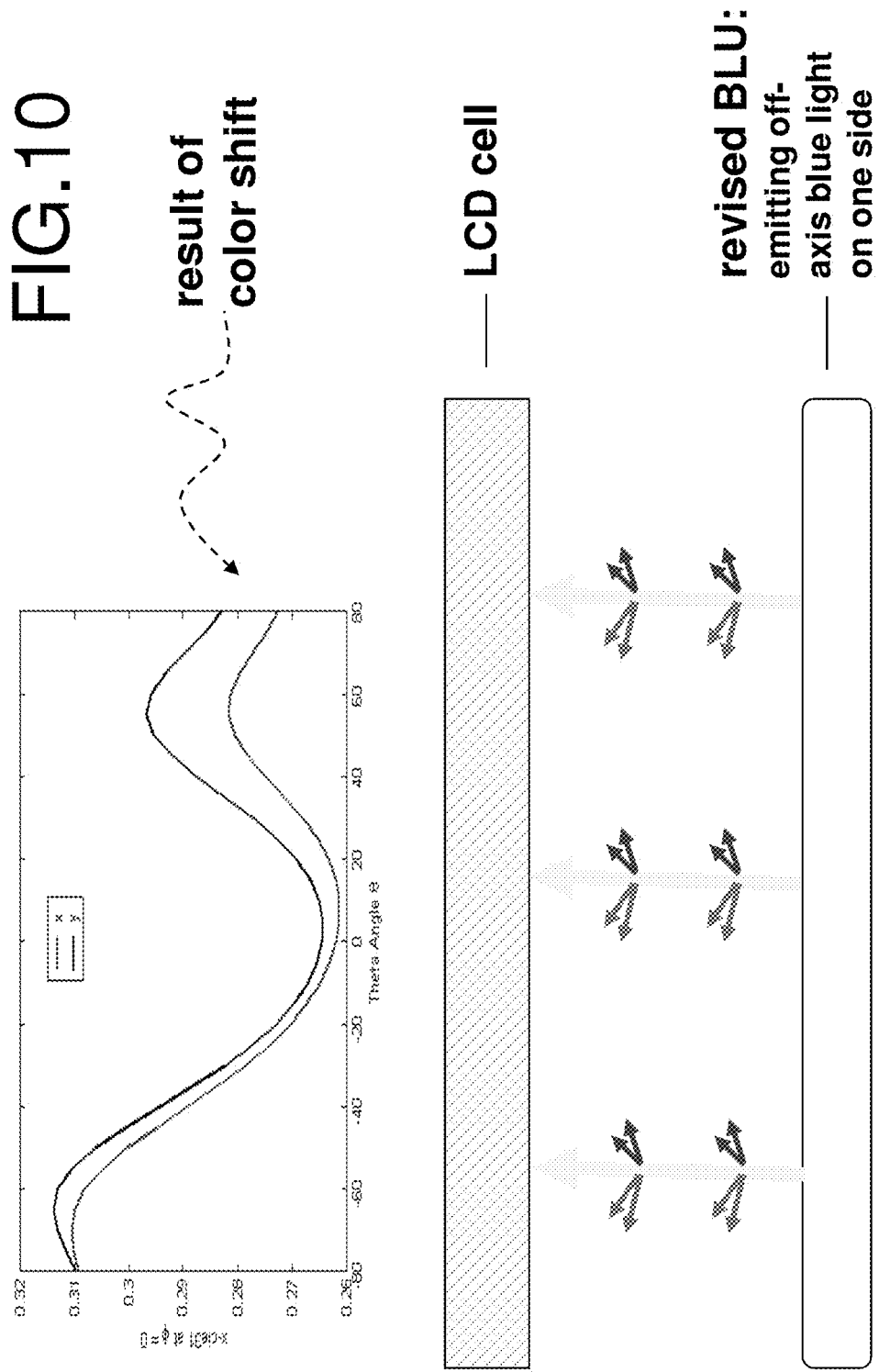

COLOR SHIFT REDUCTION IN TRANSFLECTIVE LIQUID CRYSTAL DISPLAYS

CROSS REFERENCE TO RELATED APPLICATIONS

This application is related to U.S. patent application Ser. No. 12/560,217, filed Sep. 15, 2009; U.S. patent application Ser. No. 12/782,574, filed May 18, 2010; U.S. patent application Ser. No. 12/560,258, Sep. 15, 2009; and U.S. patent application Ser. No. 12/510,424, filed Jul. 28, 2009, the entire contents of which are hereby incorporated by reference for all purposes as if fully disclosed herein.

TECHNICAL FIELD

The present disclosure relates to Liquid Crystal Displays (LCDs).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A LCD display is typically optimized for viewing along a vertical axis, or the normal direction, of a display panel. At the off-axis direction, especially at oblique angles to the display panel, severe color shifts may be observed. To reduce the color shift, rubbing angles may be changed. Alternatively, the driving voltage may be lowered. Under some techniques, multiple domains may be fabricated in a liquid crystal layer for reducing color shifts. However, none of these methods may be effective in liquid crystal displays, especially liquid crystal displays in which light leakage may be made by relatively small transmissive parts.

BRIEF DESCRIPTION OF THE DRAWINGS

In the drawings:

FIG. 1A and FIG. 1B illustrate a schematic partial cross-sectional view of an example transflective LCD sub-pixel.

FIG. 2A, FIG. 2B and FIG. 2C illustrate color shifts as an example display panel with top and bottom retardation films having tilting elevation angles is viewed from side directions around 360 degree circle.

FIG. 3A, FIG. 3B and FIG. 3C illustrate color shifts as an example display panel with top and bottom retardation films having tilting elevation angles is viewed in a horizontal plane around 180 degree half circle.

FIG. 4 illustrates color shifts as an example display panel with a top retardation film having a tilting elevation angle is viewed from side directions around 360 degree circle.

FIG. 6A and FIG. 6B illustrate color shifts as an example display panel with a bottom retardation film having a tilting elevation angle is viewed from side directions around 360 degree circle.

FIG. 7A and FIG. 7B illustrate color shifts as an example display panel with a bottom retardation film having a tilting elevation angle is viewed in a horizontal plane around 180 degree half circle.

FIG. 9 illustrates color shifts as an example diffractive optical structure for color shift correction.

FIG. 10 illustrates color shifts as an example backlight unit for color shift correction.

Figure 2A:
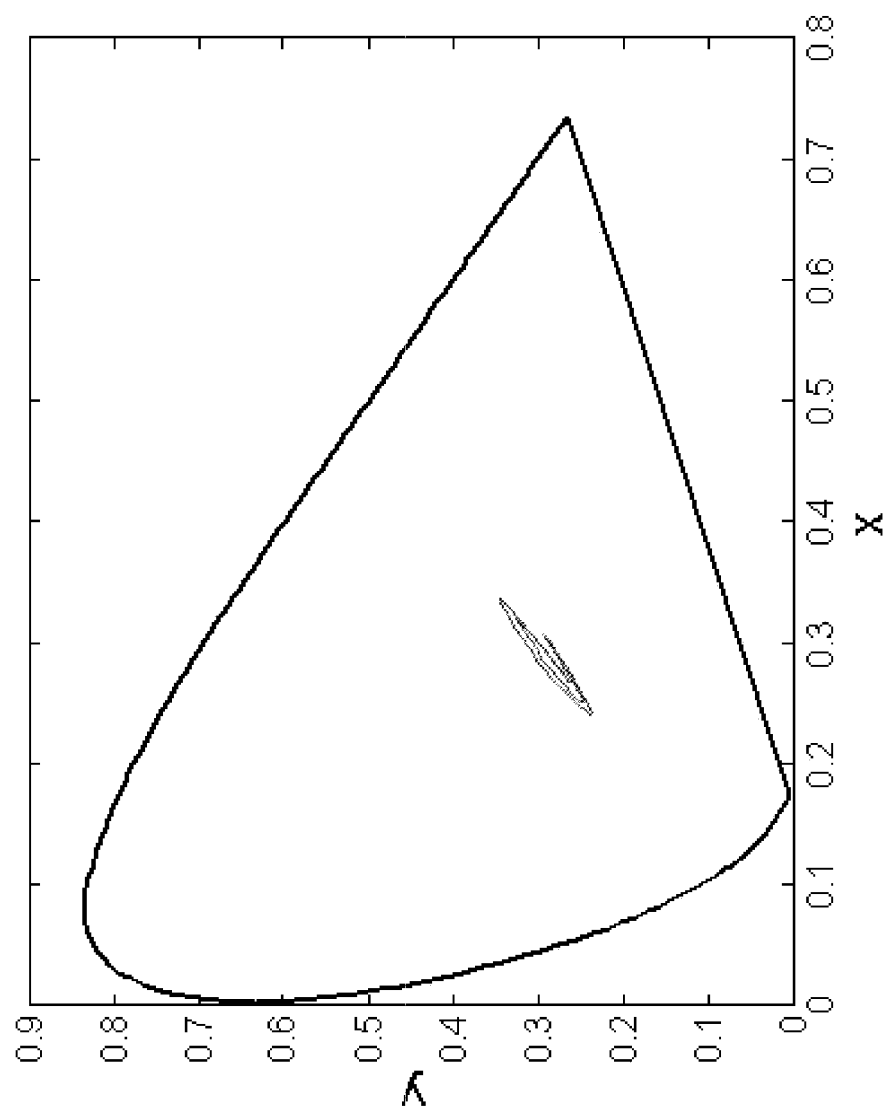

The drawings are not rendered to scale.

DETAILED DESCRIPTION

Techniques for reducing color shifts in transflective LCDs are described. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

1. General Overview

In embodiments, the LCDs use backlight, or additionally ambient light, to show color images in a transmissive or transflective operating mode, and use only ambient light to show black-and-white images in a reflective operating mode. In embodiments, the LCDs have wide view angles. In embodiments, the transflective LCDs exhibit good ambient light readability and low power consumption.

In embodiments, a subpixel of a LCD as described herein comprises a homogenously aligned liquid crystal layer in both a reflective part and a transmissive part. As used herein, "a homogenously aligned liquid crystal layer" may mean that in a voltage-off state, the liquid crystal layer remains homogeneously aligned to a same direction within each of the transmissive part and the reflective part; however, the liquid crystal layer portion in the transmissive part may or may not be aligned with the liquid crystal layer portion in the reflective part. In embodiments, the transflective LCD subpixel shows high transmittance in the transmissive part and high reflectance in the reflective part. In embodiments, backlight in the reflective part of a transflective LCD subpixel is re-circulated into the transmissive part.

In embodiments, a transflective LCD comprises a plurality of sub-pixels, each sub-pixel comprising a reflective part and a transmissive part. The reflective part comprises first portions of a first polarizing layer, a first retardation film, a bottom substrate layer, a top substrate layer opposite to the bottom substrate layer, and a common electrode portion; a reflective layer adjacent to the bottom substrate layer; and a reflective-part liquid crystal layer portion of a liquid crystal layer between the bottom substrate layer and the top substrate layer. The transmissive part comprises second portions of the first polarizing layer, the first retardation film, the bottom substrate layer, the top substrate layer, and the common electrode portion; and a transmissive-part liquid crystal layer portion of the liquid crystal layer between the bottom substrate layer and the top substrate layer.

In some embodiments, the transmissive part may additionally and/or optionally comprise portions of a second retardation film.

In embodiments, at least one of the first retardation film and the second retardation film comprises a slow axis tilted with an elevation angle from a surface of the first substrate layer. The elevation angle may, but is not limited, to be in a range of 0.5 to 85 degrees. In embodiments where there are two retardation films, the remaining retardation film may, but is not limited, to be in a range of 0 to 85 degrees.

In some embodiments, the subpixel further comprises at least one color filter that covers at least an area of the transmissive part. The subpixel is configured to express a color value associated with a color of the at least one color filter.

In some embodiments, the subpixel is a part of a composite pixel. The composite pixel comprises another subpixel that is configured to express a different color value other than the color value expressed by the subpixel.

In some embodiments, a retardation film as described herein may be one of a uni-axial retardation film, a biaxial retardation film, or an oblique retardation film.

In some embodiments, the liquid crystal layer comprises a liquid crystal material which optical birefringence is electrically controllable.

In some embodiments, the first retardation film and the first liquid crystal layer portion forms a wideband quarter-wave plate in the voltage-off state.

In some embodiments, the first retardation film has an azimuth angle of $\theta_h$, wherein the first liquid crystal layer portion has an azimuth angle of $\theta q$, wherein the azimuth angles satisfy one of (1) $60 \leq 4\theta_h - 2\theta_q \leq 120$, or (2) $-120 \leq 4\theta_h - 2\theta_q \leq -60$.

In some embodiments, the second retardation film has an azimuth angle of $\theta_h$, wherein the first liquid crystal layer portion has an azimuth angle of $\theta q$, and wherein the azimuth angles satisfy one of (1) $60 \leq 4\theta_h - 2\theta_q \leq 120$, or (2) $-120 \leq 4\theta_h - 2\theta_q \leq -60$.

In some embodiments, the liquid crystal layer comprises one or more domains. In some of these embodiments, the liquid crystal layer comprises a single domain.

In some embodiments, a transflective LCD as described herein may form a part of a computer, including but not limited to a laptop computer, netbook computer, cellular radiotelephone, electronic book reader, point of sale terminal, desktop computer, computer workstation, computer kiosk, or computer coupled to or integrated into a gasoline pump, and various other kinds of computer terminals and display units.

In some embodiments, a method comprises providing a transflective LCD as shown and described, and a backlight source to the transflective LCD.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structural Overview

FIG. 1A illustrates a schematic cross-sectional view of an example transflective LCD subpixel 100 in a voltage-off state. The term "transflective LCD subpixel" may refer to a pixel or a sub-pixel in the transflective LCD. The LCD subpixel 100 may comprise two or more parts. As illustrated, the LCD subpixel 100 comprises a transmissive part 101 and a reflective part 102 along the horizontal direction of FIG. 1A. The transmissive part 101 and the reflective part 102 have different layered structures along the vertical direction of FIG. 1A.

The LCD subpixel 100 comprises a layer 110 of homogeneously aligned liquid crystal material. When both the transmissive part 101 and the reflective part 102 comprise structures to operate in an ECB mode as illustrated here, the liquid crystal layer 110 in both the transmissive part 101 and the reflective part 102 may align with a same direction in the voltage-off state. The liquid crystal layer 110 may be filled into a cell space by a capillary effect or a one-drop filling process under vacuum conditions. In some embodiments, the liquid crystal layer 110 is typically of a positive dielectric anisotropy type with $\Delta \in > 0$.

The transmissive part 101 may have a different liquid crystal cell gap than that of the reflective part 102. As used in this disclosure, "a liquid crystal cell gap" may refer to the thickness of the liquid crystal layer in either the transmissive part or the reflective part. For example, in some embodiments, the LCD subpixel 100 comprises an over-coating layer 113 on or near a bottom substrate layer 114 in the reflective part 102. The over-coating layer 113 may be formed in a plurality of partially etched regions by a photolithographic etching process. In various embodiments, the over-coating layer 113 may comprise acrylic resin, polyamide, or novolac epoxy resin. In some embodiments, in part due to the over-coating layer 113, the cell gap size of the portion of the liquid crystal layer 110 in the reflective part 102 is approximately one half of the cell gap size of the other portion of the liquid crystal layer 110 in the transmissive part.

The inner surface, which is the top surface in FIG. 1A, of over-coating layer 113 may be covered with a metallic reflective layer 111 such as aluminum (Al) or silver (Ag) to work as a reflective electrode 111a. In some embodiments, this metallic reflective layer 111 may be a bumpy metal layer.

The bottom substrate layer 114 may be made of glass. On the inner surface, which faces the liquid crystal layer 110, of the bottom substrate layer 114 in the transmissive part 101, a transparent indium-tin oxide (ITO) layer 112 may be provided as a transmissive electrode 112a.

Color filters 123a may be deposited on or near a surface of a top substrate layer 124. The color filters may cover both the transmissive part 101 and the reflective part 102, or only cover the transmissive part 101. There may be red, green and blue (RGB) color filters 123a deposited on or near the inner surface, which faces the liquid crystal layer 110, of the top substrate layer 124 in the transmissive part 101. In areas that are not covered by the color filters 123a, a second over-coating layer 123b may be configured. This second over-coating layer 123b may be a passivation layer comprising an organic material such as a-Si:C:O and a-Si:O:F, or an inorganic material such as silicon nitride (SiNx) and silicon oxide (SiO2), prepared by plasma enhanced chemical vapor deposition or other similar sputtering methods.

An ITO layer 122 may be located between the top substrate layer 124 and the liquid crystal layer 110 as a common electrode 122a. In some embodiments, this ITO layer 122 covers the whole area of the LCD subpixel.

A bottom linear polarization layer 116 and a top linear polarization layer 126 with substantially the same polarization axis may be attached on outer surfaces of the bottom substrate layer 114 and top substrate layer 124 respectively.

A switching element may be configured in the subpixel 100 to control whether the reflective electrode 111a is connected or disconnected with the transmissive electrode 112a in the transmissive part 101. For example, in some operating modes of a transflective LCD display comprising the LCD subpixel 100, the switching element, working in conjunction with display mode control logic, may cause the reflective electrode 111a to be connected to the transmissive electrode 112a; hence, the electrodes 111a and 112a may be driven by a same signal to cause the transmissive part 101 and the reflective part 102 to simultaneously express the same pixel or subpixel value. In some other operating modes, on the other hand, the switching element may cause the reflective electrode 111a to be disconnected from the transmissive electrode 112a; the electrodes 111a and 112a may thus be driven by separate signals to cause the transmissive part 101 and the reflective part 102 to independently express different pixel or sub-pixel values. For example, in a transmissive operating mode, the transmissive part 101 may be set according to a pixel or sub-pixel value based on image data, while the reflective part 102 may be set in a dark black state. In a reflective operating mode, on the other hand, the reflective part 102 may be set according to a pixel or sub-pixel value based on image data, while the transmissive part 101 may be set in a dark black state.

The switching element may be implemented by one or more thin-film transistors (TFTs) hidden beneath the metallic reflective layer 111 in the reflective part 102 to improve the aperture ratio of the transflective LCD.

In some embodiments, in the voltage-off state, the homogeneously aligned liquid crystal layer 110 may be aligned in a direction such that the liquid crystal layer 110 in the transmissive part 101 is substantially a half-wave plate, while the liquid crystal layer 110 in the reflective part 102 is substantially a quarter-wave plate. In some embodiments, a half-wave-or-longer plate may be used in the liquid crystal layer 110 in the transmissive part. For example, a one-wave, one-and-a-half-wave, two-wave, two-and-a-half, etc., plate may be used in the liquid crystal layer 110 in the transmissive part. In some embodiments, longer than a quarter-wave plate may be used in the liquid crystal layer 110 in the reflective part. For example, a half-wave, one-wave, one-and-a-half-wave, two-wave, two-and-a-half, etc., plate may be used in the liquid crystal layer 110 in the reflective part.

In different embodiments, liquid crystal materials with different electrically controllable birefringence properties may be used in the liquid crystal layer 110. In some embodiments, rubbed polyimide layers, not shown in FIG. 1A, may be formed between (1) one of ITO layers 112, 122, and the metallic reflective layer 111 and (2) the liquid crystal layer 110 to induce molecules in the liquid crystal layer 110 near the rubbed polyimide layers to be homogeneously aligned along a rubbing direction in parallel with the planar surfaces of the substrate layers 114 and 124.

In some embodiments, a first retardation film 116 is arranged above a polarization layer 118, while a second retardation film 126 are arranged below a polarization layer 128. At least one of the retardation films 116 and 118 may be, but is not limited to, a half-wave type. The polarization layers 118 and 128 may have a substantially assigned polarization axis. Slow axis directions of the first and second retardation films 116 and 126, which may be the "extraordinary" or longitudinal direction of aligned molecules therein, may be substantially along a same direction in the subpixel 100. The liquid crystal layer 110 may be, but is not limited to, a half-wave plate in the voltage-off state. In various embodiments, transmissive part 101 of the LCD subpixel 100 may be normally black, or alternatively normally white, in the voltage-off state.

The liquid crystal layer 110 in the reflective part 102 may be, but is not limited to, a quarter-wave plate in the voltage-off state. In various embodiments, the reflective part 102 of the LCD subpixel 100 may be normally black, or alternatively normally white, in the voltage-off state.

In some embodiments, azimuth angles of the first half-wave retardation film 116 and the second half-wave retardation film 126 are the same, for example, $\theta_h$. In the voltage-off state, the liquid crystal layer 110 may form a plate with an azimuth angle of $\theta_q$. In some possible embodiments, the retardation film 116 and a half of the liquid crystal layer 110 may form a wideband plate, e.g., a wideband quarter-wave plate, while the second retardation film 126 and the other half of the liquid crystal layer 110 may form another wideband plate, e.g., another wideband quarter-wave plate. Thus, the optical configuration of the transmissive part 101 comprises two wideband plates as described.

Similarly, the azimuth angles of the second half-wave retardation film 126 and the liquid crystal layer 110 are $\theta_h$ and $\theta_q$, respectively. The optical configuration of the reflective part 102 effectively also comprises two achromatic broadband plates with the same azimuth angles $\theta_h$ and $\theta_q$ as those in the optical configuration of the transmissive part 101. In some embodiments, depending on a choice of an optimized central wavelength in the visible range from 380 nm to 780 nm, a retardation value of the achromatic broadband plates may be configured with a value between 160 nm and 400 nm. Further, in some embodiments, the azimuth angles $\theta_h$ and $\theta_q$ may be configured to satisfy one of the two relationships as follows:

$$60 \leq 4\theta_h - 2\theta_q \leq 120, \tag{Rel. 1a}$$

or $$-120 \leq 4\theta_h - 2\theta_q \leq -60 \tag{Rel. 1b}$$

In some embodiments, to realize a pair of achromatic broadband plates, e.g., achromatic broadband quarter-wave plates, in both the transmissive and reflective part, the azimuth angles $\theta_h$ and $\theta_q$ may be configured to substantially satisfy a specific relationship as follows:

$$4\theta_h - 2\theta_q = \pm 90. \tag{Rel. 1c}$$

To reduce the color dispersion of the liquid crystal layer 110 in the voltage-off state, $\theta_q$ may be configured to be 0° or 90° aligning with the rubbing direction, which is the liquid crystal alignment direction, with an angular variation of ±5°. In some embodiments, $\theta_h$ is set at around ±67.5° based on the relationship Rel. 1c above. Since the polarizer pair is aligned in parallel instead of perpendicular to each other, since the optical configurations of the transmissive part 101 and the reflective 101 substantially coincide, the LCD subpixel 100 exhibits a better gamma curve matching ability between the transmissive and reflective modes than otherwise.

FIG. 1B illustrates a schematic cross-sectional view of the example transflective LCD subpixel 100 in a voltage-on state. As illustrated in FIG. 1B, in the transmissive part 101, in the voltage-on state, the homogenously aligned liquid crystal layer 110 will be tilted up by an ECB effect due to dielectric anisotropy of the liquid crystal material in layer 110. The tilting of the liquid crystal material in layer 110 induces an optical anisotropic change. This optical anisotropic change causes the liquid crystal layer 110 in the transmissive part 101 no longer to be the same plate as in that in the voltage-off state. Consequently, the backlight 132, which is blocked in the voltage-off state, can now pass through the polarization layers 118 and 128 to show a brightness level in a plurality of brightness levels in the transmissive part 101, depending on which of a plurality of voltages, in a first voltage range, applied across the transmissive-part liquid crystal layer portion. The plurality of brightness levels for the transmissive part 101 may include a dark black state in the transmissive part 101 effectuated at one of the plurality of voltages, in the first voltage range, across the transmissive-part liquid crystal layer portion. In some embodiments, the first voltage range for all brightness levels in operation may be, but is not limited to, 0 to 1.0 volt, 0 to 2.0 volts, 0 to 2.5 volts, 2 to 4 volts, 0 to 5 volts, etc. In some embodiments, while the upper limit, for example, the maximum voltage, of the first voltage range may be a voltage between 1.0 and 2.5 volts. Thus, the transmissive part of a sub-pixel as described herein may be operated with a low voltage maximum for an operational range, for example, the first voltage range.

Similarly, in the reflective part 102, in the voltage-on state, the homogenously aligned liquid crystal layer 110 will be tilted up by an ECB effect due to dielectric anisotropy of the liquid crystal material in layer 110. This tilting of the liquid crystal material in layer 110 induces an optical anisotropic change. This change causes the liquid crystal layer 110 in the reflective part 102 no longer to be the same plate as that in the voltage-off state. Consequently, the ambient light 142, which is blocked in the voltage-off state, can reflect from the metallic reflective layer 111 to show one of a plurality of brightness levels (or display states) in the reflective part 102, depending on which of a plurality of voltages, in a second voltage range, applied across the reflective-part liquid crystal layer portion. The plurality of brightness levels for the reflective part 102 may include a dark black state in the reflective part 102 effectuated at one of the plurality of voltages, in the second voltage range, across the reflective-part liquid crystal layer portion. In some embodiments, the second voltage range for all brightness levels in operation may be, but is not limited to, 0 to 1.0 volt, 0 to 2.0 volts, 0 to 2.5 volts, 2 to 4 volts, 0 to 5 volts, etc. In some embodiments, while the upper limit, for example, the maximum voltage, of the second voltage range may be a voltage between 1.0 and 2.5 volts. Thus, the reflective part as described herein may be operated with a low voltage at maximum.

In some embodiments, both the transmissive part 101 and the reflective part 102 are in the voltage-on state. However, in some embodiments, the voltage-on state of the transmissive part 101 and the voltage-on state of the reflective part 102 may be independently set. For example, when the switching element as described causes the reflective electrode 111a to connect to the transmissive electrode 112a, both the transmissive part 101 and the reflective part 102 may be set to a luminance state based on a same pixel value. When the reflective electrode 111a is disconnected to the transmissive electrode 112a, on the other hand, the transmissive part 101 may be set to a first brightness state while the reflective part 102 may be independently set to a second different brightness state.

In some embodiments, color images can be displayed in combination with the R.G.B. color filters 123a in the transmissive part 101 in the transmissive or transflective operating modes, while black-and-white images can be shown in the reflective part 102 in the reflective operating modes. In some embodiments, one or both of the first and second half-wave retardation films 116 and 126 may be made of uniaxial retarders, biaxial retarders and oblique retarders. In embodiments where biaxial retarders are used as the first and second half-wave retardation films 116 and 126, either negative or positive biaxial retarders may be used.

The voltage-on state of the transmissive part 101 and the voltage-on state of the reflective part 102 may be independently set. For example, when the reflective electrode 111a is connected to the transmissive electrode 112a, both the transmissive part 101 and the reflective part 102 may be set to a correlated brightness state. When the reflective electrode 111a is disconnected to the transmissive electrode 112a, the transmissive part 101 may be set to a first brightness state while the reflective part 102 may be set to a second different brightness state. In some embodiments, the first voltage range for the transmissive-part liquid crystal layer portion may be different from the second voltage range for the reflective-part liquid crystal layer portion. For example, when the reflective-part liquid crystal layer portion is driven by a voltage of 3.5 volts in the second voltage range from 2 to 4 volts, the transmissive-part liquid crystal layer portion may be driven by a voltage of 1.5 volts in the first voltage range from 0 to 2 volts.

In some embodiments, color images can be displayed in combination with the R.G.B. color filters 123a in the transmissive part 101 in the transmissive or transflective operating modes, while black and white monochromic images can be shown in the reflective part 102 since there are no color filters on this region in the reflective operating modes.

3. Example Retardation Films

3.1. Top and Bottom Retardation Films with Tilting Elevation Angles

3.1.1. Example 1

In example embodiments, each of the first retardation film 116 and the second retardation film 126 is a half-wave film having a tilting elevation angle between the slow axis of the half-wave film and the substrate plane surface of the liquid crystal display device, which may be parallel to a surface of the first substrate layer in a transflective LCD as described herein. The tilting elevation angles of the first retardation film 116 and the second retardation film 126 may be same, or different. Each tilting elevation angle may be no more than 5, 10, 15, 20, 25, 30, 35, 40, 45, . . . 85, or a different value. In an example embodiment, the first retardation film 116 and the second retardation film 126 are arranged after and before the respective nearby polarizer along the same optical axis direction in the transmissive part to form a normally black (NB), normally white (NW), or mixed transmissive LC mode at the voltage-off state. Each of the first retardation film 116 and the second retardation film 126 may be uniformly tilted within its own stretched polymeric film, or continuously tilted with rode-like or disctotic-like polymeric liquid crystal materials. In the example embodiment, the ambient light enters the top polarizer, the second retardation film 126 that may be a half wave retardation film, and the liquid crystal layer and is reflected by a metal reflector on the bottom substrate to form a NB reflective mode.

In some embodiments, electrodes such as ITO layers as described herein may be driven uniformly as a mono-domain under one or more applied voltages. Effective phase retardations at different viewing angles including oblique viewing angles are different. Even though a pixel comprising one, two, three or more subpixels may be driven to express a particular color value accurately at the front viewing direction. As viewed with different angles, for example, from 180 degree side viewing angles in a horizontal viewing plane or 360 degree side viewing angles around the display, the pixel's color may be shifted from the particular color value, resulting in yellow shift in some angles, blue shift in some other angles, etc. If not addressed, this color shift may impact the color performance of the transflective LCD, especially at the oblique or side viewing angles.

In some embodiments, the first retardation film 116 and the second retardation film 126 with tilting elevation angles at their respective azimuthal angles compensate the varied phase retardation of the switched mono-domain LC layer at different viewing angles and balance the color shifts at different viewing angles including oblique viewing angles. In this way, the color coordinates of the transflective LCD can be finely tuned and the off-axis yellow shift and/or other color shifts can be reduced.

In an exemplary embodiment, parameters for the liquid crystal layer are: birefringence $\Delta n$ may be, but is not limited to, 0.067; dielectric anisotropy $\Delta \in$ may be, but is not limited to, 6.6; and rotational viscosity $\gamma 1$ may be, but is not limited to, 0.140 Pa·s. The liquid crystal layer has homogenous alignment in the initial voltage-off state. The azimuth angle $\theta_h$ for the liquid crystal layer may be, but is not limited to, 60 degrees. The pre-tilt angle of the liquid crystal layer may be, but is not limited to, within 3 degrees. The azimuthal angle $\theta_h$ for each of the first retardation film 116 and the second retardation film may be, but is not limited to, 307.5 degrees. The effective tilting elevation angle of the first retardation film 116 may, but is not limited to, be the same as the effective tilting elevation angle of the second retardation film 126. A tilting elevation angle $\theta_t$ for a retardation film such as the first retardation film 116 and the second retardation film 126 may vary from 0.5 to 85 degrees, for example, 5 degrees. TABLE 1.1 shows additional parameters for an example LCD subpixel, with an area ratio 30:70 between the transmissive part and the reflective part. For the purpose of comparison, the optical performance of transflective LCDs with no tilting elevation angles for retardation films are also provided.

TABLE 1.1

| Components | | Example value |
|---|---|---|
| Top polarization layer | absorption axis (°) | 60 |
| Top half-wave film | slow axis direction (°) | 307.5 |
| | Tilt angle (°) | 5 |
| | phase retardation (nm) | 275 |
| LC layer in transmissive part | alignment direction (°) | 60 |
| | cell gap (μm) | 4.0 |
| LC layer in reflective part | alignment direction (°) | 60 |
| | cell gap (μm) | 2.0 |
| Bottom half-wave film | slow axis direction (°) | 307.5 |
| | Tilt angle (°) | 5 |
| | phase retardation (nm) | 275 |
| Bottom polarization layer | absorption axis (°) | 60 |

Figure 8:
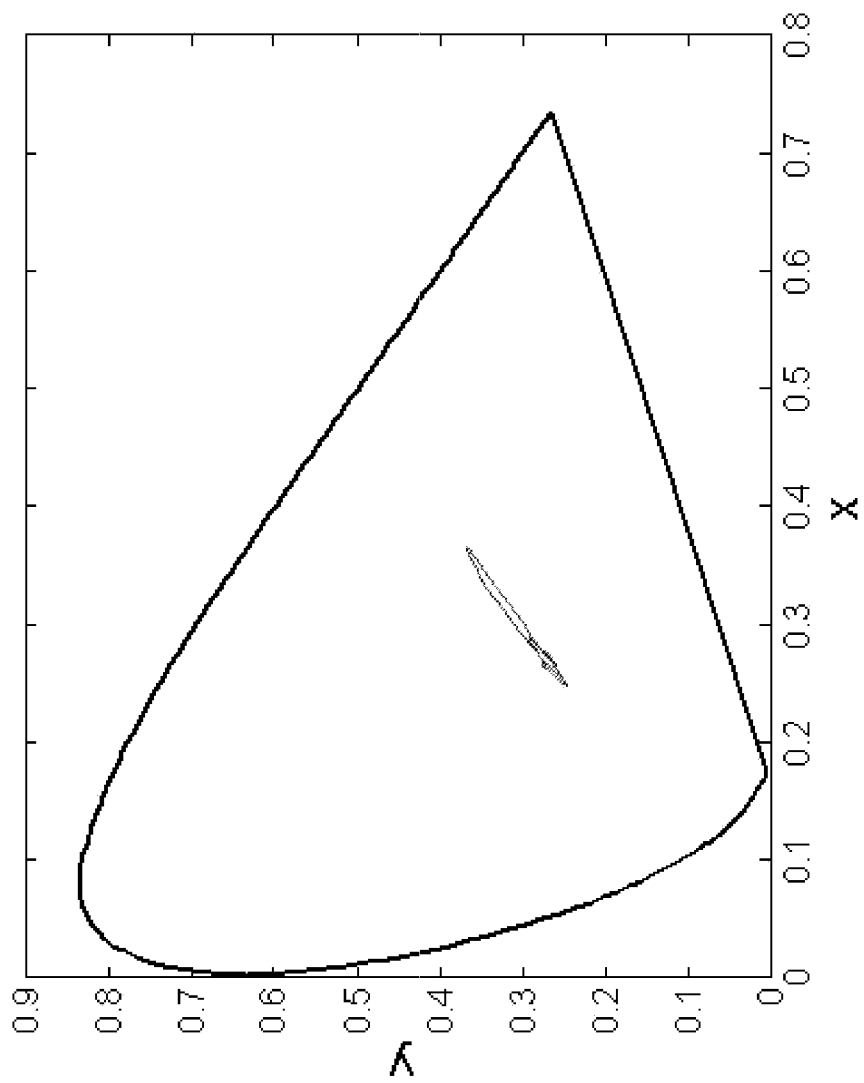
FIG. 8 illustrates color shifts as an example display panel with no retardation film having a tilting elevation angle is viewed from side directions around 360 degree circle.

FIG. 8 shows color shifts of an example transflective LCD comprising retardation films with no tilting elevation angles but with other parameters as shown in TABLE 1.1 in the transmissive mode, plotted in the CIE 1931 chromaticity diagram. FIG. 2A shows color shifts of an example transflective LCD comprising retardation films with tilting elevation angles in the transmissive mode, plotted in the same CIE 1931 chromaticity diagram. White light is incident from 60 degrees and scanned across the whole 360 degrees azimuthal range at 10 degree scanning steps. The color shifts from the white light form color shift trajectories in the middle of the chromaticity diagrams. In FIG. 8, a noticeable yellow shift appears at an azimuthal angle of 15 degrees with a color coordinate, (x,y) =(0.3656, 0.3674). In contrast, in FIG. 2A, color shifts have been reduced with a maximum yellow shift is as low as (x,y)=(0.3365, 0.3444) at an azimuthal angle of 25 degrees, which is further away from the horizontal direction of the transflective LCD display panel that parallels the viewing level of a viewer in the front of the display panel.

Figure 3A:
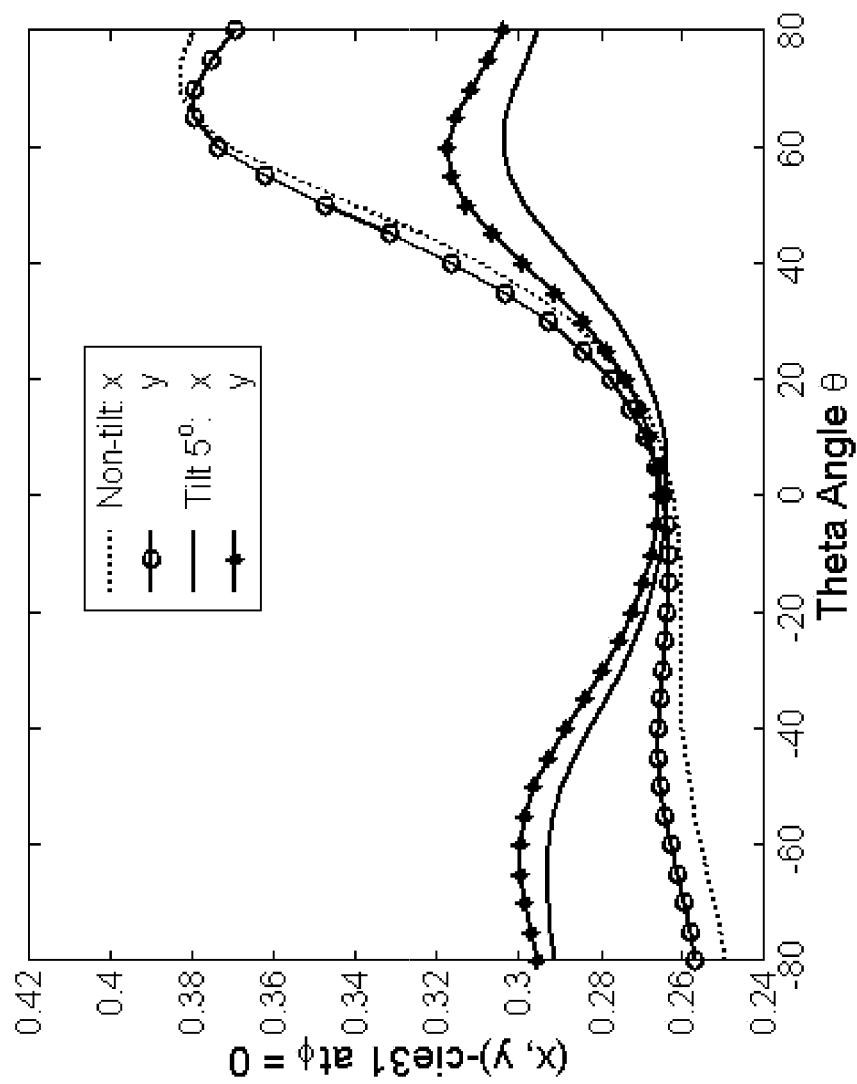

In evaluating the color uniformity of an LCD device, an observer may care about the color performance in the horizontal and vertical direction of the display panel. For example, the color shift in various horizontal directions when the display panel is placed vertically in front of the observer may be measured. FIG. 3A compares color shifts between a transflective LCD comprising retardation films as shown in TABLE 1.1 with tilting elevation angles and a transflective LCD comprising retardation films without tilting elevation angles. It can be seen that the more oblique the viewing angle is, the more prominent the color shift is for the transflective LCD comprising retardation films without tilting elevation angles. In particular, color shifts may increase sharply especially to one side, e.g., the right side, of the device, which means a severe shift in yellowness in these viewing angles. In contrast, with the transflective LCD comprising retardation films with the tilting elevation angles, color shifts on the right side have been significantly reduced, for example, with much less yellow shift. Similarly, color shifts on the left side have also been reduced, for example, with much less blue shift. The color performance improvements may be attributed to the retardation films with tilting elevation angles, which compensate the phase retardations of the switched mono-domain LC layer, and balance the color shifts at the oblique viewing angles.

3.1.2. Example 2

In example embodiments, each of the first retardation film 116 and the second retardation film 126 may be uniformly tilted within its own stretched polymeric film, or continuously tilted with rode-like or disctotic-like polymeric liquid crystal materials. However, the first retardation film 126 may be tilted with a certain tilt angle, qt1, between its slow axis and the substrate plane surface of the liquid crystal display device, while the second retardation film 126 may be tilted with a different tilted angle, qt2. In some embodiments, each of the first retardation film 116 and the second retardation film 126 maintains the same efficient half-wave phase retardation as that of a non-tilted half-wave film along the normal direction. In the example embodiment, the ambient light enters the top polarizer, the second retardation film 126 that may be a half wave retardation film, and the liquid crystal layer and is reflected by a metal reflector on the bottom substrate to form a NB reflective mode.

In some embodiments, the first retardation film 116 and the second retardation film 126 with tilting elevation angles at their respective azimuthal angles compensate the varied phase retardation of the switched mono-domain LC layer at different viewing angles and balance the color shifts at different viewing angles including oblique viewing angles. In this way, the color coordinates of the transflective LCD can be finely tuned and the off-axis yellow shift and/or other color shifts can be reduced.

In an embodiment, parameters for the liquid crystal layer are: birefringence $\Delta n$ may be, but is not limited to, 0.067; dielectric anisotropy $\Delta \epsilon$ may be, but is not limited to, 6.6; and rotational viscosity $\gamma 1$ may be, but is not limited to, 0.140 Pa·s. The liquid crystal layer has homogenous alignment in the initial voltage-off state. The azimuth angle $\theta_h$ for the liquid crystal layer may be, but is not limited to, 60 degrees. The pre-tilt angle of the liquid crystal layer may be, but is not limited to, be within 3 degrees. The azimuthal angle $\theta_h$ for each of the first retardation film 116 and the second retardation film may be, but is not limited to, 307.5 degree. The effective tilting elevation angles of the first retardation film 116 and the second retardation film 126 may be shown in TABLE 1.2. A tilting elevation angle $\theta_t$ for a retardation film such as the first retardation film 116 and the second retardation film 126 may vary from 0.5 to 20 degrees, for example, 5 degrees. TABLE 1.2 shows additional parameters for an example LCD subpixel, with an area ratio 30:70 between the transmissive part and the reflective part. For the purpose of comparison, the optical performance of transflective LCDs with no tilting elevation angles for retardation films are also provided.

TABLE 1.2

| Components | | Example value |
|---|---|---|
| Top polarization layer | absorption axis (°) | 60 |
| Top half-wave film | slow axis direction (°) | 307.5 |
| | Tilt angle (°) | 3 |
| | phase retardation (nm) | 275 |
| LC layer in transmissive part | alignment direction (°) | 60 |
| | cell gap (μm) | 4.0 |
| LC layer in reflective part | alignment direction (°) | 60 |
| | cell gap (μm) | 2.0 |
| Bottom half-wave film | slow axis direction (°) | 307.5 |
| | Tilt angle (°) | 7 |
| | phase retardation (nm) | 275 |
| Bottom polarization layer | absorption axis (°) | 60 |

Figure 2B:
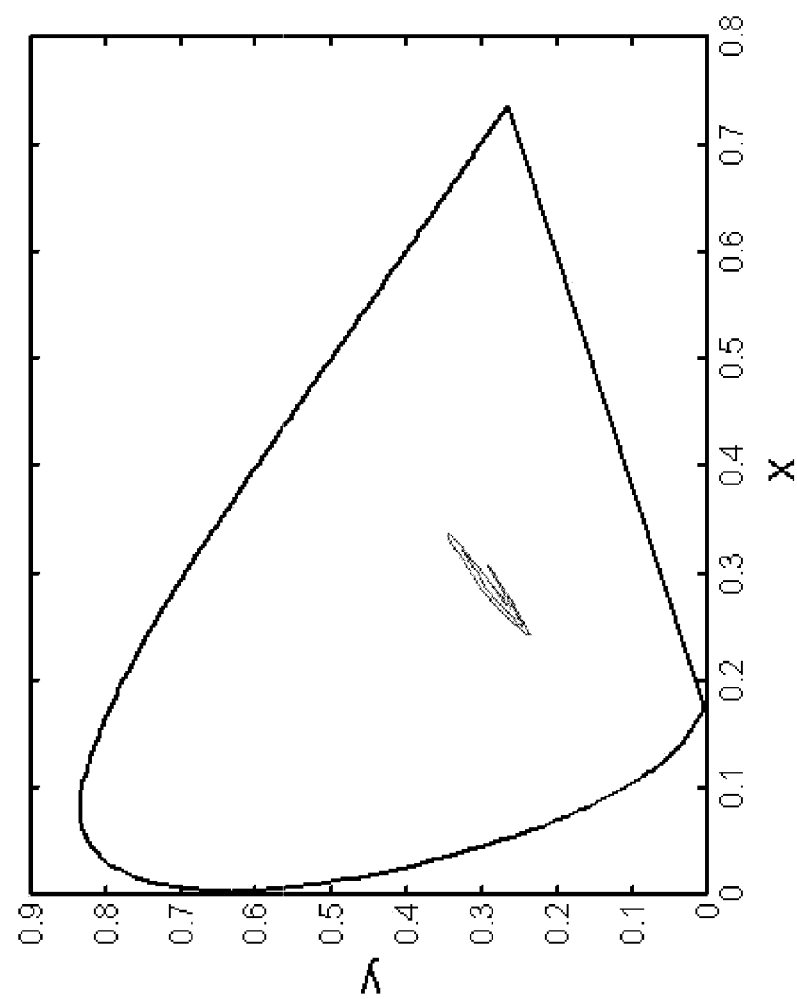

FIG. 2B shows color shifts of an example transflective LCD comprising retardation films with tilting elevation angles as shown in TABLE 1.2 in the transmissive mode, plotted in the same CIE 1931 chromaticity diagram. White light is incident from 60 degrees and scanned across the whole 360 degrees azimuthal range at 10 degree scanning steps. The color shifts from the white light form color shift trajectories in the middle of the chromaticity diagrams. As previously noted, in FIG. 8, a noticeable yellow shift appears at an azimuthal angle of 15 degrees with a color coordinate, (x,y)=(0.3656, 0.3674). In contrast, in FIG. 2B, color shifts have been reduced with a maximum yellow shift is as low as (x,y)=(0.3360, 0.3440) at an azimuthal angle of 25 degrees, which is further away from the horizontal direction of the transflective LCD display panel that parallels the viewing level of a viewer in the front of the display panel.

Figure 3B:
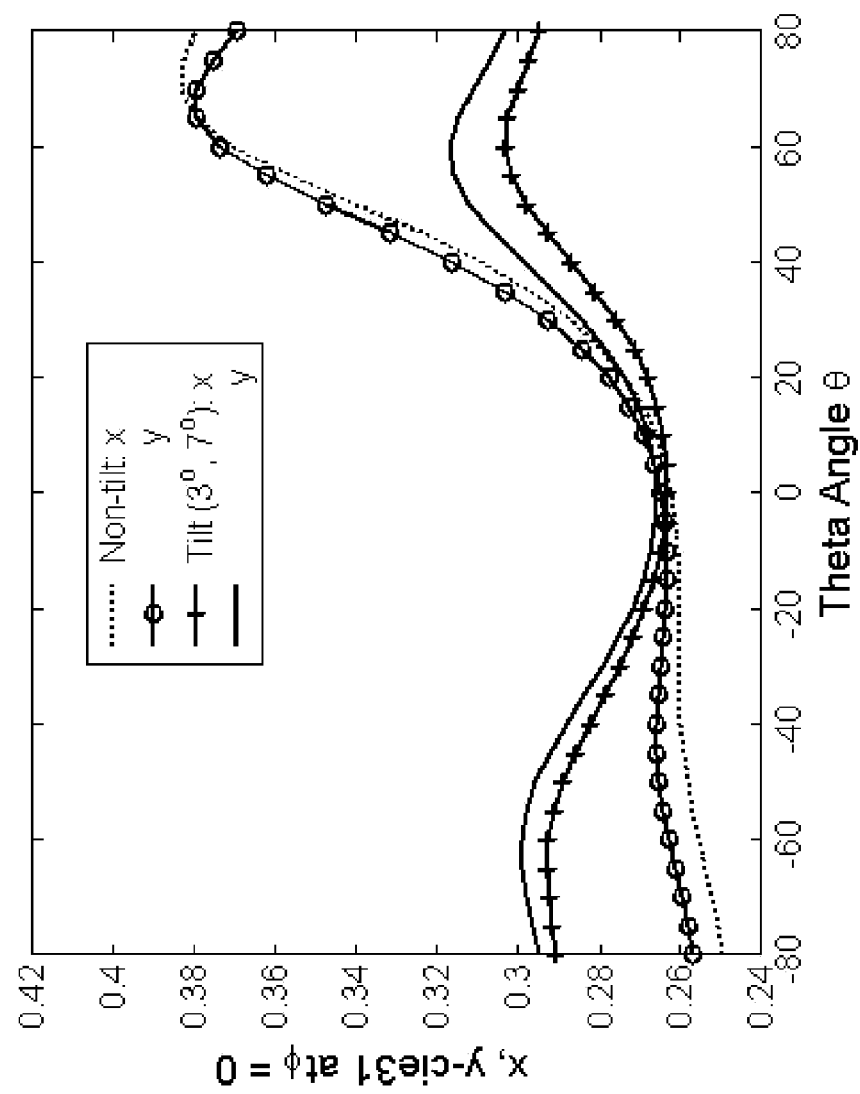

FIG. 3B compares color shifts between a transflective LCD comprising retardation films with tilting elevation angles as shown in TABLE 1.2 and a transflective LCD comprising retardation films without tilting elevation angles. It can be seen that the more oblique the viewing angle is, the more prominent the color shift is with the transflective LCD comprising retardation films without tilting elevation angles. In particular, color shifts increase sharply especially to the right side of the device, which means a severe yellowness shift in these viewing angles. In contrast, the transflective LCD comprising retardation films with the tilting elevation angles, color shifts on the right side have been significantly reduced, with much less yellow shift. Similarly, color shifts on the left side have also been reduced, with much less blue shift. The color performance improvements may be attributed to the retardation films with tilting elevation angles, which compensate the phase retardations of the switched mono-domain LC layer, and balance the color shifts at the oblique viewing angles.

3.1.3. Example 3

In example embodiments, each of the first retardation film 116 and the second retardation film 126 may be uniformly tilted within its own stretched polymeric film, or continuously tilted with rode-like or disctotic-like polymeric liquid crystal materials. However, the first retardation film 126 may be tilted with a certain tilt angle, qt1, between its slow axis and the substrate plane surface of the liquid crystal display device, while the second retardation film 126 may be tilted with a different tilted angle, qt2. In some embodiments, each of the first retardation film 116 and the second retardation film 126 maintains the same efficient half-wave phase retardation as that of a non-tilted half-wave film along the normal direction. In the example embodiment, the ambient light enters the top polarizer, the second retardation film 126 that may be a half wave retardation film, and the liquid crystal layer and is reflected by a metal reflector on the bottom substrate to form a NB reflective mode.

In some embodiments, the first retardation film 116 and the second retardation film 126 with tilting elevation angles at their respective azimuthal angles compensate the varied phase retardation of the switched mono-domain LC layer at different viewing angles and balance the color shifts at different viewing angles including oblique viewing angles. In this way, the color coordinates of the transflective LCD can be finely tuned and the off-axis yellow shift and/or other color shifts can be reduced.

In an exemplary embodiment, parameters for the liquid crystal layer are: birefringence Δn may be, but is not limited to, 0.067; dielectric anisotropy Δ∈ may be, but is not limited to, 6.6; and rotational viscosity γ1 may be, but is not limited to, 0.140 Pa·s. The liquid crystal layer has homogenous alignment in the initial voltage-off state. The azimuth angle $\theta_h$ for the liquid crystal layer may be, but is not limited to, 60 degrees. The pre-tilt angle of the liquid crystal layer may, but is not limited to, be within 3 degrees. The azimuthal angle for the first retardation film 116 may be 307.5 degree, while the azimuthal angle for the second retardation film may be, but is not limited to, 127.5 degree. The effective tilting elevation angles of the first retardation film 116 and the second retardation film 126 may be shown in TABLE 1.3. A tilting elevation angle $\theta_t$ for a retardation film such as the first retardation film 116 and the second retardation film 126 may vary from 0.5 to 20 degrees, for example, 5 degrees. TABLE 1.3 shows additional parameters for an example LCD subpixel, with an area ratio 30:70 between the transmissive part and the reflective part. For the purpose of comparison, the optical performance of transflective LCDs with no tilting elevation angles for retardation films are also provided.

TABLE 1.3

| Components | | Example value |
|---|---|---|
| Top polarization layer | absorption axis (°) | 60 |
| Top half-wave film | slow axis direction (°) | 307.5 |
| | Tilt angle (°) | 15 |
| | phase retardation (nm) | 275 |
| LC layer in transmissive part | alignment direction (°) | 60 |
| | cell gap (μm) | 4.0 |
| LC layer in reflective part | alignment direction (°) | 60 |
| | cell gap (μm) | 2.0 |
| Bottom half-wave film | slow axis direction (°) | 127.5 |
| | Tilt angle (°) | 5 |
| | phase retardation (nm) | 275 |
| Bottom polarization layer | absorption axis (°) | 60 |

FIG. 2C shows color shifts of an example transflective LCD comprising retardation films with different azimuthal and tilting elevation angles as shown in TABLE 1.3 in the transmissive mode, plotted in the same CIE 1931 chromaticity diagram. White light is incident from 60 degrees and scanned across the whole 360 degrees azimuthal range at 10 degree scanning steps. The color shifts from the white light form color shift trajectories in the middle of the chromaticity diagrams. As previously noted, in FIG. 8, a noticeable yellow shift appears at an azimuthal angle of 15 degrees with a color coordinate, (x,y)=(0.3656, 0.3674). In contrast, in FIG. 2C, color shifts have been reduced with a maximum yellow shift is as low as (x,y)=(0.3239, 0.3347) at an azimuthal angle of 25 degrees, which is further away from the horizontal direction of the transflective LCD display panel that parallels the viewing level of a viewer in the front of the display panel.

FIG. 3C compares color shifts between a transflective LCD comprising retardation films with tilting elevation angles as shown in TABLE 1.3 and a transflective LCD comprising retardation films without tilting elevation angles. It can be seen that the more oblique the viewing angle is, the more prominent the color shift is with the transflective LCD comprising retardation films without tilting elevation angles. In particular, color shifts increase sharply especially to the right side of the device, which means a severe yellowness shift in these viewing angles. In contrast, the transflective LCD comprising retardation films with the tilting elevation angles, color shifts on the right side have been significantly reduced, with much less yellow shift. Similarly, color shifts on the left side have also been reduced, with much less blue shift. The color performance improvements may be attributed to the retardation films with tilting elevation angles, which compensate the phase retardations of the switched mono-domain LC layer, and balance the color shifts at the oblique viewing angles.

3.2. Top Retardation Film with a Tilting Elevation Angle

Example 4

In example embodiments, while the first retardation film 116 has no tilting elevation angle, the second retardation film 126 has a tilting elevation angle between the slow axis and the substrate plane surface of the liquid crystal display device. The tilting elevation angle may be no more than 5, 10, 15, 20, 25, 30, 35, 40, 45, . . . 85, or a different value. In an example embodiment, the first retardation film 116 and the second retardation film 126 are arranged after and before the respective nearby polarizer along the same optical axis direction in the transmissive part to form a normally black (NB) transmissive LC mode at the voltage-off state. Each of the first retardation film 116 and the second retardation film 126 may be uniformly oriented within its own stretched polymeric film, or continuously tilted with rode-like or disctotic-like polymeric liquid crystal materials. In the example embodiment, the ambient light enters the top polarizer, then the second retardation film 126 that may be a half wave retardation film, and the liquid crystal layer and is reflected by a metal reflector on the bottom substrate to form a NB reflective mode.

In some embodiments, the second retardation film 126 with a tilting elevation angle at the azimuthal angle compensates the varied phase retardation of the switched mono-domain LC layer at different viewing angles and balances the color shifts at different viewing angles including oblique viewing angles. In this way, the color coordinates of the transflective LCD can be finely tuned and the off-axis yellow shift and/or other color shifts can be reduced.

In an embodiment, parameters for the liquid crystal layer are: birefringence $\Delta n$ may be, but is not limited to, 0.067; dielectric anisotropy $\Delta \in$ may be, but is not limited to, 6.6; and rotational viscosity $\gamma 1$ may be, but is not limited to, 0.140 Pa·s. The liquid crystal layer has homogenous alignment in the initial voltage-off state. The azimuth angle $\theta_h$ for the liquid crystal layer may be, but is not limited to, 60 degrees. The pre-tilt angle of the liquid crystal layer may be, but is not limited to, be within 3 degrees. The azimuthal angle for the first retardation film 116 may be, but is not limited to, 127.5 degrees. The azimuthal angle for the second retardation film 126 may be, but is not limited to, 307.5 degrees. A tilting elevation angle $\theta_t$ for the second retardation film 126 may vary from 0.5 to 85 degrees, for example, 10 degrees. TABLE 2 shows additional parameters for an example LCD subpixel, with an area ratio 30:70 between the transmissive part and the reflective part. For the purpose of comparison, the optical performance of transflective LCDs with no tilting elevation angles for retardation films are also provided.

TABLE 2

| Components | | Example value |
|---|---|---|
| Top polarization layer | absorption axis (°) | 60 |
| Top half-wave film | slow axis direction (°) | 307.5 |
| | Tilt angle (°) | 10 |
| | phase retardation (nm) | 275 |
| LC layer in transmissive part | alignment direction (°) | 60 |
| | cell gap (μm) | 4.0 |
| LC layer in reflective part | alignment direction (°) | 60 |
| | cell gap (μm) | 2.0 |
| Bottom half-wave film | slow axis direction (°) | 127.5 |
| | Tilt angle (°) | 0 |
| | phase retardation (nm) | 275 |
| Bottom polarization layer | absorption axis (°) | 60 |

FIG. 4 shows color shifts of an example transflective LCD comprising a top retardation film with a tilting elevation angle in the transmissive mode, plotted in the same CIE 1931 chromaticity diagram. White light is incident from 60 degrees and scanned across the whole 360 degrees azimuthal range at 10 degree scanning steps. The color shifts from the white light form color shift trajectories in the middle of the chromaticity diagrams. As previously noted, in FIG. 8, a noticeable yellow shift appears at an azimuthal angle of 15 degrees with a color coordinate, (x,y)=(0.3656, 0.3674). In contrast, in FIG. 4, color shifts have been reduced with a maximum yellow shift is as low as (x,y)=(0.3333, 0.3421) at an azimuthal angle of 25 degrees, which is further away from the horizontal direction of the transflective LCD display panel that parallels the viewing level of a viewer in the front of the display panel.

Figure 5:
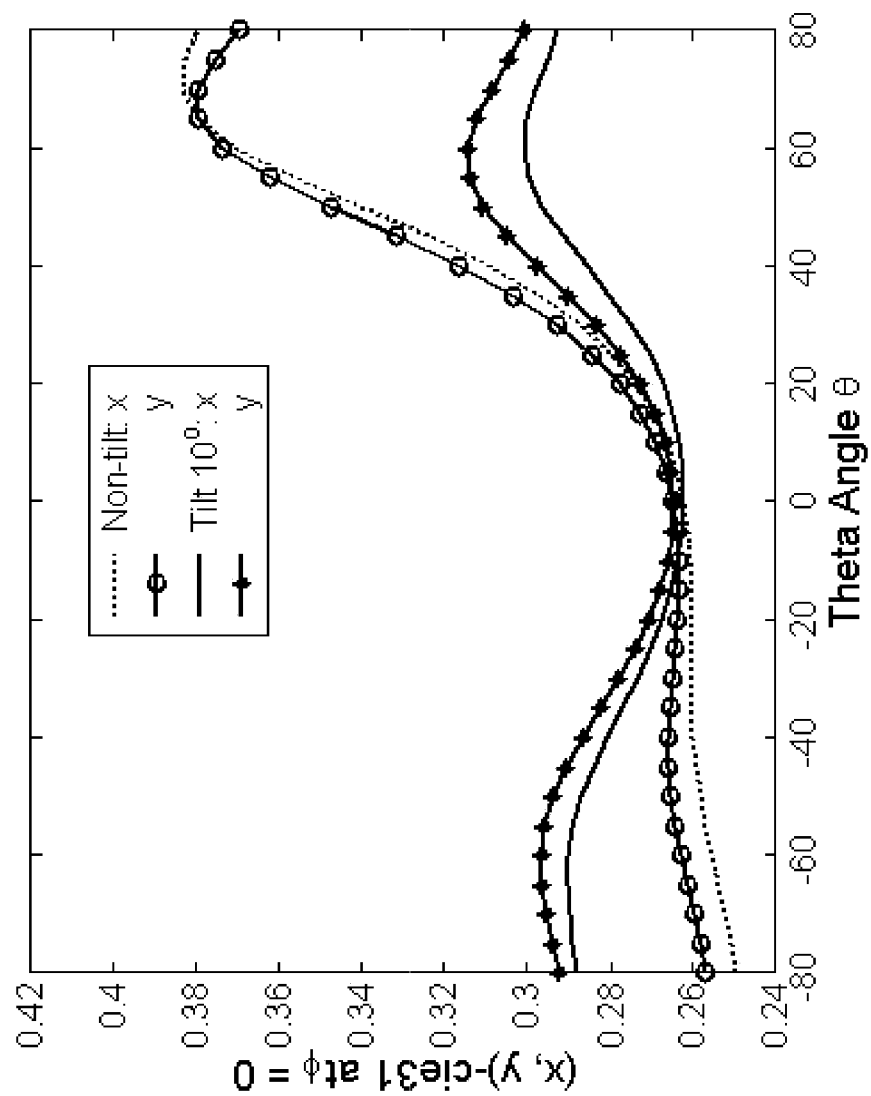
FIG. 5 illustrates color shifts as an example display panel with a top retardation film having a tilting elevation angle is viewed in a horizontal plane around 180 degree half circle.

FIG. 5 compares color shifts between a transflective LCD comprising a top retardation film with a tilting elevation angle and a transflective LCD comprising retardation films without tilting elevation angles. It can be seen that the more oblique the viewing angle is, the more prominent the color shift is with the transflective LCD comprising retardation films without tilting elevation angles. In particular, color shifts increase sharply especially to the right side of the device, which means a severe yellowness shift in these viewing angles. In contrast, the transflective LCD comprising the top retardation film with the tilting elevation angle, color shifts on the right side have been significantly reduced, with much less yellow shift. Similarly, color shifts on the left side have also been reduced, with much less blue shift. The color performance improvements may be attributed to the top retardation film with the tilting elevation angle, which compensates the phase retardations of the switched mono-domain LC layer, and balances the color shifts at the oblique viewing angles.

3.3. Bottom Retardation Film with a Tilting Elevation Angle

3.3.1. Example 5

In example embodiments, while the first retardation film 116 has a tilting elevation angle between the slow axis and the substrate plane surface of the liquid crystal display device, the second retardation film 126 has no tilting elevation angle. The tilting elevation angle may be no more than 5, 10, 15, 20, 25, 30, 35, 40, 45, . . . 85, or a different value. In an example embodiment, the first retardation film 116 and the second retardation film 126 are arranged after and before the respective nearby polarizer along the same optical axis direction in the transmissive part to form a normally black (NB) transmissive LC mode at the voltage-off state. Each of the first retardation film 116 and the second retardation film 126 may be uniformly oriented within its own stretched polymeric film, or continuously tilted with rode-like or disctotic-like polymeric liquid crystal materials. In the example embodiment, the ambient light enters the top polarizer, then the second retardation film 126 that may be a half wave retardation film, and then the liquid crystal layer and is reflected by a metal reflector on the bottom substrate to form a NB reflective mode.

In some embodiments, the first retardation film 116 with a tilting elevation angle at the azimuthal angle compensates the varied phase retardation of the switched mono-domain LC layer at different viewing angles and balances the color shifts at different viewing angles including oblique viewing angles. In this way, the color coordinates of the transflective LCD can be finely tuned and the off-axis yellow shift and/or other color shifts can be reduced. Since the first retardation film 116 is located near the bottom polarizer layer, which can not contribute to the reflective part 102, a relatively large tilting elevation angle may be used.

In an exemplary embodiment, parameters for the liquid crystal layer are: birefringence Δn may be, but is not limited to, 0.067; dielectric anisotropy Δ∈ may be, but is not limited to, 6.6; and rotational viscosity γ1 may be, but is not limited to, 0.140 Pa·s. The liquid crystal layer has homogenous alignment in the initial voltage-off state. The azimuth angle $\theta_h$ for the liquid crystal layer may be, but is not limited to, 60 degrees. The pre-tilt angle of the liquid crystal layer may, but is not limited to, be within 3 degrees. The azimuthal angle for the second retardation film 126 may be, but is not limited to, 127.5 degrees. The azimuthal angle for the first retardation film 116 may be, but is not limited to, 307.5 degrees. A tilting elevation angle $\theta_t$ for the first retardation film 116 may vary from 0.5 to 85 degrees, for example, 10 degrees. Table 3.1 shows additional parameters for an example LCD subpixel, with an area ratio 30:70 between the transmissive part and the reflective part. For the purpose of comparison, the optical performance of transflective LCDs with no tilting elevation angles for retardation films are also provided.

TABLE 3.1

| Components | | Example value |
| --- | --- | --- |
| Top polarization layer | absorption axis (°) | 60 |
| Top half-wave film | slow axis direction (°) | 127.5 |
| | Tilt angle (°) | 0 |
| | phase retardation (nm) | 275 |
| LC layer in transmissive part | alignment direction (°) | 60 |
| | cell gap (μm) | 4.0 |
| LC layer in reflective part | alignment direction (°) | 60 |
| | cell gap (μm) | 2.0 |
| Bottom half-wave film | slow axis direction (°) | 307.5 |
| | Tilt angle (°) | 10 |
| | phase retardation (nm) | 275 |
| Bottom polarization layer | absorption axis (°) | 60 |

FIG. 6A shows color shifts of an example transflective LCD comprising a bottom retardation film with a tilting elevation angle in the transmissive mode, plotted in the same CIE 1931 chromaticity diagram. White light is incident from 60 degrees and scanned across the whole 360 degrees azimuthal range at 10 degree scanning steps. The color shifts from the white light form color shift trajectories in the middle of the chromaticity diagrams. As previously noted, in FIG. 8, a noticeable yellow shift appears at an azimuthal angle of 15 degrees with a color coordinate, (x,y)=(0.3656, 0.3674). In contrast, in FIG. 6A, color shifts have been reduced with a maximum yellow shift is as low as (x,y)=(0.3333, 0.3420) at an azimuthal angle of 25 degrees, which is further away from the horizontal direction of the transflective LCD display panel that parallels the viewing level of a viewer in the front of the display panel.

FIG. 7A compares color shifts between a transflective LCD comprising a bottom retardation film with a tilting elevation angle and a transflective LCD comprising retardation films without tilting elevation angles. It can be seen that the more oblique the viewing angle is, the more prominent the color shift is with the transflective LCD comprising retardation films without tilting elevation angles. In particular, color shifts increase sharply especially to the right side of the device, which means a severe yellowness shift in these viewing angles. In contrast, the transflective LCD comprising the bottom retardation film with the tilting elevation angle, color shifts on the right side have been significantly reduced, with much less yellow shift. Similarly, color shifts on the left side have also been reduced, with much less blue shift. The color performance improvements may be attributed to the bottom retardation film with the tilting elevation angle, which compensates the phase retardations of the switched mono-domain LC layer, and balances the color shifts at the oblique viewing angles.

3.3.2. Example 6

In an exemplary embodiment, parameters for the liquid crystal layer are: birefringence Δn may be, but is not limited to, 0.067; dielectric anisotropy Δ∈ may be, but is not limited to, 6.6; and rotational viscosity γ1 may be, but is not limited to, 0.140 Pa·s. The liquid crystal layer has homogenous alignment in the initial voltage-off state. The azimuth angle $\theta_h$ for the liquid crystal layer may be, but is not limited to, 60 degrees. The pre-tilt angle of the liquid crystal layer may, but is not limited to, be within 3 degrees. The azimuthal angle for the second retardation film 126 may be, but is not limited to, 127.5 degrees. The azimuthal angle for the first retardation film 116 may be, but is not limited to, 307.5 degrees. A tilting elevation angle $\theta_t$ for the first retardation film 116 may vary from 0.5 to 85 degrees, for example, 5 degrees. TABLE 3.2 shows additional parameters for an example LCD subpixel, with an area ratio 30:70 between the transmissive part and the reflective part. For the purpose of comparison, the optical performance of transflective LCDs with no tilting elevation angles for retardation films are also provided.

TABLE 3.2

| Components | | Example value |
| --- | --- | --- |
| Top polarization layer | absorption axis (°) | 60 |
| Top half-wave film | slow axis direction (°) | 127.5 |
| | Tilt angle (°) | 0 |
| | phase retardation (nm) | 275 |
| LC layer in transmissive part | alignment direction (°) | 60 |
| | cell gap (μm) | 4.0 |
| LC layer in reflective part | alignment direction (°) | 60 |
| | cell gap (μm) | 2.0 |
| Bottom half-wave film | slow axis direction (°) | 307.5 |
| | Tilt angle (°) | 5 |
| | phase retardation (nm) | 275 |
| Bottom polarization layer | absorption axis (°) | 60 |

Figure 6B:
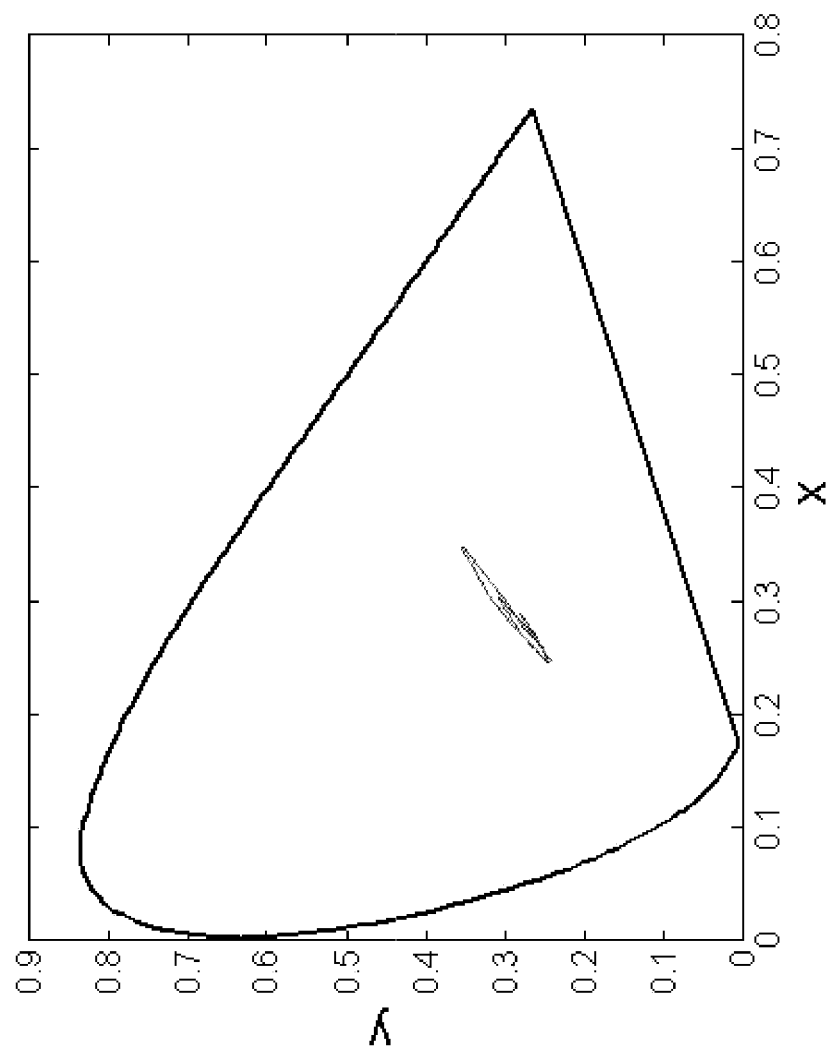

FIG. 6B shows color shifts of an example transflective LCD comprising a bottom retardation film with a tilting elevation angle in the transmissive mode, plotted in the same CIE 1931 chromaticity diagram. White light is incident from 60 degrees and scanned across the whole 360 degrees azimuthal range at 10 degree scanning steps. The color shifts from the white light form color shift trajectories in the middle of the chromaticity diagrams. As previously noted, in FIG. 8, a noticeable yellow shift appears at an azimuthal angle of 15 degrees with a color coordinate, (x,y)=(0.3656, 0.3674). In contrast, in FIG. 6B, color shifts have been reduced with a maximum yellow shift is as low as (x,y)=(0.3483, 0.3543) at an azimuthal angle of 20 degrees, which is further away from the horizontal direction of the transflective LCD display panel that parallels the viewing level of a viewer in the front of the display panel.

Figure 7B:
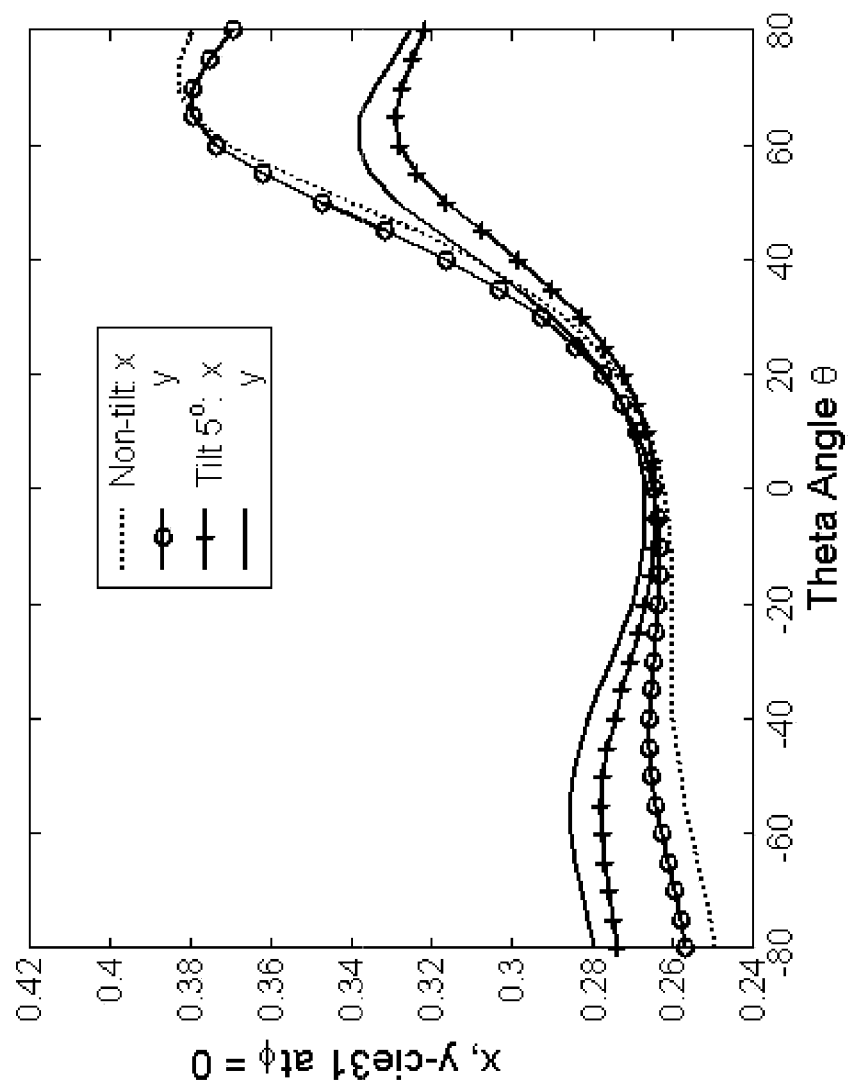

FIG. 7B compares color shifts between a transflective LCD comprising a bottom retardation film with a tilting elevation angle and a transflective LCD comprising retardation films without tilting elevation angles. It can be seen that the more oblique the viewing angle is, the more prominent the color shift is with the transflective LCD comprising retardation films without tilting elevation angles. In particular, color shifts increase sharply especially to the right side of the device, which means a severe yellowness shift in these viewing angles. In contrast, the transflective LCD comprising the bottom retardation film with the tilting elevation angle, color shifts on the right side have been significantly reduced, with much less yellow shift. Similarly, color shifts on the left side have also been reduced, with much less blue shift. The color performance improvements may be attributed to the bottom retardation film with the tilting elevation angle, which compensates the phase retardations of the switched mono-domain LC layer, and balances the color shifts at the oblique viewing angles.

5. Example 7

FIG. 9 shows an example diffractive optical structure, which transmits some portions of wavelengths of blue light at the right side of FIG. 9, where color shift may be reduced, and an example result of color shift correction.

In some embodiments, the transflective LCD may comprise various optical structures, such as one or more diffractive optical structures and prismatic structures, which selectively transmit a small range of wavelength (for example the wavelengths of the blue) into a certain direction. In some embodiments, the optical structures may transmit incident light and bend some of the bluish light more to the side, rather than the front, to compensate for the yellowish tinges of the LC mode on the side. The structures may include but are not limited to, for example, a Bragg diffractive structure that redirects some of the blue portion of light incident on it to the proper range of angles. Alternatively and/or optionally, anomalous dispersion may be used in place of, or in addition to, prismatic films to achieve the asymmetric emission of colored light that directs tinge-correction color light to the side directions.

6. Example 8

FIG. 10 shows an example backlight unit, which emit a mixture of LED light with some portion of the wavelengths of blue light at the right side of FIG. 10, where color shift at the right side of the LCD may be reduced.

In some embodiments, instead of building the optical structures in the LCD structures, one or more of the optical structures may be built into a light guide plate and/or a LED (light emitting diodes) light bar that is configured to align incident directions of backlight from a backlight unit. An example may be adding blue or bluish LEDs in the backlight unit that work with white LEDs to create a mixture of light wavelengths, in order to provide bluer light to off-axis directions to compensate color shifts of an LCD display in these directions.

7. Extensions and Variations

To illustrate a clear example, transflective LCD sub-pixels described herein comprise a first metallic reflective layer and a second metallic reflective layer. The transflective LCD sub-pixels may further comprise a third reflective layer between the bottom substrate layer and the top substrate layer. This third reflective layer may be placed in the transmissive part or the reflective part of a transflective LCD or both. In some embodiments, the first metallic reflective layer may be of a pattern that comprises multiple reflective components.

To illustrate a clear example, transflective LCD sub-pixels described herein comprise a first metallic reflective layer and a second metallic reflective layer. The transflective LCD sub-pixels may further comprise a third reflective layer between the bottom substrate layer and the top substrate layer. This third reflective layer may be placed in the transmissive part or the reflective part of a transflective LCD or both. In some embodiments, the first metallic reflective layer may be of a pattern that comprises multiple reflective components.

To illustrate a clear example, a first electrode layer and a second electrode layer are placed adjacent to a bottom substrate layer and a top substrate layer, respectively. In other embodiments, both electrode layers may be placed adjacent to one of the bottom substrate layer and the top substrate layer.

While embodiments of the invention have been illustrated and described, it will be clear that the invention is not limited to these embodiments only. Numerous modifications, changes, variations, substitutions and equivalents will be apparent to those skilled in the art without departing from the spirit and scope of the invention, as described in the claims.

What is claimed is:

1. A transflective liquid crystal display comprising a plurality of sub-pixels, each sub-pixel comprising:
    a reflective part, comprising:
        first portions of a first retardation film, a first polarizing layer, a bottom substrate layer, a top substrate layer, and a common electrode portion, wherein the top substrate layer is opposite to the bottom substrate layer;
        a reflective layer adjacent to the bottom substrate layer;
        a reflective-part liquid crystal layer portion of a liquid crystal layer between the bottom substrate layer and the top substrate layer;
    a transmissive part, comprising:
        second portions of the first retardation film, the first polarizing layer, the bottom substrate layer, the top substrate layer, and the common electrode portion;
        a transmissive-part liquid crystal layer portion of the liquid crystal layer between the bottom substrate layer and the top substrate layer;
    wherein the first retardation film comprises a first slow axis tilted with a first elevation angle with respect to a surface of the first substrate layer, wherein the first elevation angle is in a range of 0.5 to 85 degrees;
    wherein the first retardation film and the first liquid crystal layer portion form a wideband quarter-wave plate in the voltage-off state.

2. The transflective liquid crystal display according to claim 1, wherein the subpixel further comprises at least one color filter that covers at least an area of the transmissive part, wherein the subpixel is configured to express a color value associated with a color of the at least one color filter.

3. The transflective liquid crystal display according to claim 2, wherein the subpixel is a part of a composite pixel, and wherein the composite pixel comprises another subpixel that is configured to express a different color value other than the color value expressed by the subpixel.

4. The transflective liquid crystal display according to claim 1, wherein the first retardation film is one of a uni-axial retardation film, a biaxial retardation film, or an oblique retardation film.

5. The transflective liquid crystal display according to claim 1, wherein the liquid crystal layer comprises a liquid crystal material which optical birefringence is electrically controllable.

6. The transflective liquid crystal display according to claim 1, wherein the first retardation film has an azimuth angle of $\theta_h$, wherein the first liquid crystal layer portion has an azimuth angle of $\theta_q$, and wherein the azimuth angles satisfy one of $60 \leq 4\theta_h - 2\theta_q \leq 120$, or $-120 \leq 4\theta_h - 2\theta_q \leq -60$.

7. The transflective liquid crystal display according to claim 1, wherein the liquid crystal layer comprises one or more domains.

8. A transflective liquid crystal display comprising a plurality of sub-pixels, each sub-pixel comprising:
a reflective part, comprising:
first portions of a first retardation film, a first polarizing layer, a bottom substrate layer, a top substrate layer, and a common electrode portion, wherein the top substrate layer is opposite to the bottom substrate layer;
a reflective layer adjacent to the bottom substrate layer;
a reflective-part liquid crystal layer portion of a liquid crystal layer between the bottom substrate layer and the top substrate layer;
a transmissive part, comprising:
second portions of the first retardation film, the first polarizing layer, the bottom substrate layer, the top substrate layer, the common electrode portion, and portions of a second retardation film;
a transmissive-part liquid crystal layer portion of the liquid crystal layer between the bottom substrate layer and the top substrate layer;
wherein the second retardation film comprises a second slow axis tilted with a second elevation angle with respect to a surface of the first substrate layer, wherein the second elevation angle is in a range of 0.5 to 85 degrees;
wherein the first retardation film and the first liquid crystal layer portion form a wideband quarter-wave plate in the voltage-off state.

9. The transflective liquid crystal display according to claim 1, wherein the second retardation film has an azimuth angle of $\theta_h$, wherein the second liquid crystal layer portion has an azimuth angle of $\theta_q$, and wherein the azimuth angles satisfy one of $60 \leq 4\theta_h - 2\theta_q \leq 120$, or $-120 \leq 4\theta_h - 2\theta_q \leq -60$.

10. The transflective liquid crystal display according to claim 1, wherein the first retardation film comprises a first slow axis tilted with a first elevation angle from the surface of the first substrate layer, and wherein the first elevation angle is in a range of 0 to 15 degrees.

11. A computing device, comprising:
one or more processors;
a transflective liquid crystal display comprising a plurality of sub-pixels, each sub-pixel comprising:
a reflective part, comprising:
first portions of a first retardation film, a first polarizing layer, a bottom substrate layer, a top substrate layer, and a common electrode portion, wherein the top substrate layer is opposite to the bottom substrate layer;
a reflective layer adjacent to the bottom substrate layer;
a reflective-part liquid crystal layer portion of a liquid crystal layer between the bottom substrate layer and the top substrate layer;
a transmissive part, comprising:
second portions of the first retardation film, the first polarizing layer, the bottom substrate layer, the top substrate layer, and the common electrode portion;
a transmissive-part liquid crystal layer portion of the liquid crystal layer between the bottom substrate layer and the top substrate layer;
wherein the first retardation film comprises a first slow axis tilted with a first elevation angle with respect to a surface of the first substrate layer, wherein the first elevation angle is in a range of 0.5 to 85 degrees;
wherein the first retardation film and the first liquid crystal layer portion form a wideband quarter-wave plate in the voltage-off state.

12. The computing device according to claim 11, wherein the subpixel further comprises at least one color filter that covers at least an area of the transmissive part, wherein the subpixel is configured to express a color value associated with a color of the at least one color filter.

13. The computing device according to claim 12, wherein the subpixel is a part of a composite pixel, and wherein the composite pixel comprises another subpixel that is configured to express a different color value other than the color value expressed by the subpixel.

14. The computing device according to claim 11, wherein the first retardation film is one of a uni-axial retardation film, a biaxial retardation film, or an oblique retardation film.

15. The computing device according to claim 11, wherein the liquid crystal layer comprises a liquid crystal material which optical birefringence is electrically controllable.

16. The computing device according to claim 11, wherein the first retardation film has an azimuth angle of $\theta_h$, wherein the first liquid crystal layer portion has an azimuth angle of $\theta_q$, and wherein the azimuth angles satisfy one of $60 \leq 4\theta_h - 2\theta_q \leq 120$, or $-120 \leq 4\theta_h - 2\theta_q \leq -60$.

17. The computing device according to claim 11, wherein the liquid crystal layer comprises one or more domains.

18. A method of fabricating a transflective liquid crystal display, comprising:
forming a plurality of pixels by:
forming a reflective part, comprising:
first portions of a first retardation film, a first polarizing layer, a bottom substrate layer, a top substrate layer, and a common electrode portion, wherein the top substrate layer is opposite to the bottom substrate layer;
a reflective layer adjacent to the bottom substrate layer;
a reflective-part liquid crystal layer portion of a liquid crystal layer between the bottom substrate layer and the top substrate layer;
forming a transmissive part, comprising:
second portions of the first retardation film, the first polarizing layer, the bottom substrate layer, the top substrate layer, and the common electrode portion;

a transmissive-part liquid crystal layer portion of the liquid crystal layer between the bottom substrate layer and the top substrate layer;

wherein the first retardation film comprises a first slow axis tilted with a first elevation angle with respect to a surface of the first substrate layer, wherein the first elevation angle is in a range of 0.5 to 85 degrees;

wherein the first retardation film and the first liquid crystal layer portion form a wideband quarter-wave plate in the voltage-off state.

* * * * *